(12) United States Patent
Hayashi et al.

(10) Patent No.: US 7,588,807 B2
(45) Date of Patent: *Sep. 15, 2009

(54) RETARDATION FILM AND METHOD OF PRODUCING THE SAME, AND OPTICAL FILM, LIQUID CRYSTAL PANEL, AND LIQUID CRYSTAL DISPLAY APPARATUS ALL USING THE RETARDATION FILM

(75) Inventors: Masaki Hayashi, Osaka (JP); Naoki Koishi, Osaka (JP); Masahiro Hata, Osaka (JP); Shuuji Yano, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 484 days.

This patent is subject to a terminal disclaimer.

(21) Appl. No.: 11/210,118

(22) Filed: Aug. 24, 2005

(65) Prior Publication Data

US 2006/0062934 A1    Mar. 23, 2006

(30) Foreign Application Priority Data

Aug. 26, 2004  (JP) .............................. 2004-246535
May 10, 2005   (JP) .............................. 2005-137045

(51) Int. Cl.
   *G02F 1/13363* (2006.01)
(52) U.S. Cl. .................. 428/1.3; 349/118; 359/499
(58) Field of Classification Search .................. 428/1.3, 428/1.31, 1.32, 1.33, 1.5, 1.54; 349/117–122; 359/499
   See application file for complete search history.

(56) References Cited

U.S. PATENT DOCUMENTS

| 6,565,974  | B1* | 5/2003  | Uchiyama et al. | 428/412 |
| 7,264,852  | B2* | 9/2007  | Koishi et al.   | 428/1.3 |
| 2002/0089748 | A1* | 7/2002  | Umemoto         | 359/497 |
| 2003/0193635 | A1* | 10/2003 | Mi et al.       | 349/117 |
| 2005/0018328 | A1* | 1/2005  | Hata et al.     | 359/883 |

FOREIGN PATENT DOCUMENTS

| JP | 2-160204      | 6/1990  |
| JP | 4-305602      | 10/1992 |
| JP | 5-157911      | 6/1993  |
| JP | 1999-125716 A | 5/1999  |
| JP | 11-305217     | 11/1999 |
| JP | 2000-009930 A | 1/2000  |
| JP | 2000-39610    | 2/2000  |
| JP | 2001-147325 A | 5/2001  |
| JP | 2001-318224 A | 11/2001 |

\* cited by examiner

*Primary Examiner*—David R Sample
*Assistant Examiner*—Sophie Hon
(74) *Attorney, Agent, or Firm*—Westerman, Hattori, Daniels & Adrian, LLP.

(57) ABSTRACT

A retardation film which hardly causes shift or unevenness in retardation values and which has a refractive index profile of nx>nz>ny (that is, 0<Rth[590]/Re[590]<1) is provided.

A retardation film according to an embodiment of the present invention comprises a stretched polymer film containing a styrene-based resin and a polycarbonate-based resin, which satisfies the following expressions (1) and (2):

$$100 \text{ nm} \leq Re[590] \leq 350 \text{ nm} \tag{1}$$

$$0.2 \leq Rth[590]/Re[590] \leq 0.8 \tag{2}$$

14 Claims, 9 Drawing Sheets

RETARDATION FILM AND METHOD OF PRODUCING THE SAME, AND OPTICAL FILM, LIQUID CRYSTAL PANEL, AND LIQUID CRYSTAL DISPLAY APPARATUS ALL USING THE RETARDATION FILM

BACKGROUND OF THE INVENTION

1. Field of the Invention

The present invention relates to a retardation film and to a method of producing the same. To be specific, the present invention relates to a retardation film which hardly causes shift or unevenness in retardation values, which has excellent mechanical strength, and which can be applied to a large liquid crystal display apparatus, and to a method of producing the retardation film. Further, the present invention relates to an optical film, a liquid crystal panel, and a liquid crystal display apparatus all using the retardation film.

2. Description of the Related Art

A liquid crystal display apparatus is generally provided with a polarizer on both sides of a liquid crystal cell. Further, the liquid crystal display apparatus is conventionally provided with a retardation film between the liquid crystal cell and the polarizer for optical compensation of retardation due to birefringence of the liquid crystal cell in a front direction and an oblique direction. In order to improve display properties of the liquid crystal display apparatus in an oblique direction, it is very important to determine how retardation values of the retardation film change in an oblique direction with varying angles.

There is disclosed a retardation film in which retardation values are substantially constant regardless of angles (JP 02-160204 A, for example). The retardation film has a refractive index profile of nx>nz>ny, when nx, ny, and nz represent refractive indices in a slow axis direction, fast axis direction, and thickness direction of the film, respectively. There is also disclosed a liquid crystal display apparatus of IPS mode or VA mode with improved viewing angle properties in an oblique direction by using a polarizing plate employing the retardation film or by using the retardation film (JP 11-305217 A, JP 2000-39610 A, and JP 04-305602 A, for example)

There is disclosed a method of producing a retardation film having a refractive index profile of nx>nz>ny involving: bonding a shrinkable film on one side or both sides of a polymer film for formation of a laminate; and subjecting the laminate to heat stretching treatment (JP 05-157911 A, for example). In the production method, a refractive index profile of the polymer film must be changed greatly before and after the stretching. Thus, the polymer film to be preferably used easily causes retardation with a low stretch ratio, and examples thereof generally used include aromatic polymer films of a polycarbonate-based resin, a polyarylate-based resin, a polysulfone-based resin, and the like. However, the aromatic polymer film has a large photoelastic coefficient and has an easily varying retardation by stress. Thus, the aromatic polymer film has a problem of degrading display properties as described below. In a case where an aromatic polymer film attached between a liquid crystal cell and a polarizer is exposed to high temperatures, retardation values may depart from designed values due to shrinkage stress of the polarizer. In a case where an aromatic polymer film is used for a liquid crystal display apparatus, uneven stress generated by heat of backlight may cause unevenness in retardation values. Meanwhile, an aliphatic resin film such as a norbornene-based resin film has a small photoelastic coefficient. However, the aliphatic resin film hardly causes retardation, and desired retardation values cannot be obtained through stretching at a low stretch ratio as in the aromatic polymer film, or even at a high stretch ratio. The stretching at a high stretch ratio causes a problem of breaking of the film.

SUMMARY OF THE INVENTION

The present invention has been made in view of solving the above problems, and an object of the present invention is therefore to provide: a retardation film which hardly causes shift or unevenness in retardation values and which has a refractive index profile of nx>nz>ny (that is, 0<Rth[590]/Re[590]<1); and a method of producing the retardation film. Another object of the present invention is to provide an optical film, a liquid crystal panel, and a liquid crystal display apparatus all using the retardation film.

The inventors of the present invention have conducted intensive studies, and have found that a retardation film and a method of producing the retardation film described below are capable of attaining the above objects, to thereby complete the present invention.

A retardation film according to an embodiment of the present invention includes a stretched polymer film containing a styrene-based resin and a polycarbonate-based resin, which satisfies the following expressions (1) and (2):

$$100 \text{ nm} \leq Re[590] \leq 350 \text{ nm} \tag{1}$$

$$0.2 \leq Rth[590]/Re[590] \leq 0.8 \tag{2}.$$

In one embodiment of the invention, a content of the styrene-based resin is 10 to 40 parts by weight with respect to 100 parts by weight of a total solid content.

In another embodiment of the invention, the polycarbonate-based resin includes repeating units represented by the following formulae (3) and (4):

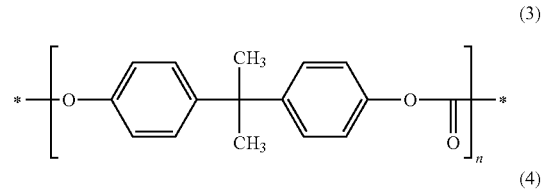

(3)

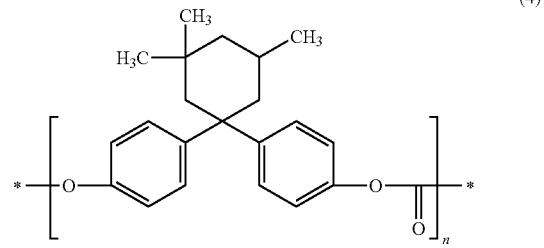

(4)

In the formulae (3) and (4), n represents an integer of 2 or more.

In still another embodiment of the invention, an absolute value of photoelastic coefficient of the retardation film measured by using light of a wavelength of 590 nm at 23° C. is $2.0 \times 10^{-11}$ to $8.0 \times 10^{-11}$ m$^2$/N.

According to another aspect of the invention, an optical film is provided. The optical film includes a polarizer and a retardation film laminated on at least one side of the polarizer, wherein: a slow axis of the retardation film is one of parallel and perpendicular to an absorption axis of the polarizer; the retardation film comprises a stretched polymer film containing a styrene-based resin and a polycarbonate-based resin; and the retardation film satisfies the following expressions (1) and (2):

$$100 \text{ nm} \leq Re[590] \leq 350 \text{ nm} \quad (1)$$

$$0.2 \leq Rth[590]/Re[590] \leq 0.8 \quad (2).$$

In one embodiment of the invention, the optical film further includes a transparent protective film on at least one side of the polarizer.

In another embodiment of the invention, the transparent protective film is provided on both sides of the polarizer; the retardation film is laminated on at least one transparent protective film; and the transparent protective film having the retardation film laminated thereon satisfies the following expressions (5) and (6):

$$0 \text{ nm} < Re[590] \leq 5 \text{ nm} \quad (5)$$

$$0 \text{ nm} < Rth[590] \leq 10 \text{ nm} \quad (6).$$

According to still another aspect of the invention, a liquid crystal panel is provided. The liquid crystal panel includes a liquid crystal cell and a retardation film on at least one side of the liquid crystal cell, wherein:

the retardation film comprises a stretched polymer film containing a styrene-based resin and a polycarbonate-based resin; and the retardation film satisfies the following expressions (1) and (2):

$$100 \text{ nm} \leq Re[590] \leq 350 \text{ nm} \quad (1)$$

$$0.2 \leq Rth[590]/Re[590] \leq 0.8 \quad (2).$$

A liquid crystal panel according to another embodiment of the present invention includes a liquid crystal cell and an optical film on at least one side of the liquid crystal cell, wherein: the optical film comprises a polarizer and a retardation film laminated on at least one side of the polarizer; a slow axis of the retardation film is one of parallel and perpendicular to an absorption axis of the polarizer; the retardation film comprises a stretched polymer film containing a styrene-based resin and a polycarbonate-based resin; and the retardation film satisfies the following expressions (1) and (2):

$$100 \text{ nm} \leq Re[590] \leq 350 \text{ nm} \quad (1)$$

$$0.2 \leq Rth[590]/Re[590] \leq 0.8 \quad (2).$$

In one embodiment of the invention, the liquid crystal cell includes a liquid crystal cell of one of TN mode, VA mode, IPS mode, FFS mode, and OCB mode.

According to still another aspect of the invention, a liquid crystal display apparatus is provided. The liquid crystal display apparatus includes the above-described liquid crystal panel.

According to still another aspect of the invention, a liquid crystal television is provided. The liquid crystal television includes the above-described liquid crystal panel.

According to still another aspect of the invention, a method of producing a retardation film is provided. The method includes: attaching a shrinkable film to one of one side and both sides of a polymer film containing a styrene-based resin and a polycarbonate-based resin; and heat stretching the resultant.

In one embodiment of the invention, the shrinkable film includes a biaxially stretched polypropylene film.

In another embodiment of the invention, the shrinkable film has a shrinkage ratio in a longitudinal direction of the film $S^{140}$(MD) of 2.7 to 9.4%, and a shrinkage ratio in a width direction of the film $S^{140}$(TD) of 4.6 to 15.8% at 140° C.

In still another embodiment of the invention, a difference $\Delta S^{140} = S^{140}(TD) - S^{140}(MD)$ between the shrinkage ratio in a width direction of the film $S^{140}$(TD) and the shrinkage ratio in a longitudinal direction of the film $S^{140}$(MD) at 140° C. falls within a range of $0.1\% \leq \Delta S^{140} \leq 3.9\%$.

In still another embodiment of the invention, the shrinkable film has a shrinkage ratio in a longitudinal direction of the film $S^{160}$(MD) of 13 to 23%, and a shrinkage ratio in a width direction of the film $S^{160}$(TD) of 30 to 48% at 160° C.

In still another embodiment of the invention, a difference $\Delta S^{160} = S^{160}(TD) - S^{160}(MD)$ between the shrinkage ratio in a width direction of the film $S^{160}$(TD) and the shrinkage ratio in a longitudinal direction of the film $S^{160}$(MD) at 160° C. falls within a range of $8\% \leq \Delta S^{160} \leq 30\%$.

In still another embodiment of the invention, the shrinkable film has a shrinkage stress in a width direction of 0.15 to 0.75 N/2 mm at 140° C.

In still another embodiment of the invention, the shrinkable film has a shrinkage stress in a width direction of 0.20 to 0.85 N/2 mm at 150° C.

In still another embodiment of the invention, a stretching temperature of the polymer film is (Tg of the polymer film +1° C.) to (Tg+30° C.).

In still another embodiment of the invention, a stretch ratio of the polymer film is 1.05 to 2.00 times.

The retardation film according to the present invention is a stretched polymer film containing a polycarbonate-based resin and a styrene-based resin. The retardation film contains the polycarbonate-based resin and the styrene-based resin and therefore has a small photoelastic coefficient. Thus, the retardation film used for a liquid crystal display apparatus hardly causes shift or unevenness in retardation values. No retardation film having a refractive index profile of nx>nz>ny (that is, 0<Rth[590]/Re[590]<1) had been hitherto obtained by stretching a polymer film having a small photoelastic coefficient. However, in the present invention, a shrinkable film having a predetermined shrinkage ratio is attached to one side or both sides of the polymer film and the whole is heat stretched, to thereby provide a retardation film having a refractive index profile of nx>nz>ny and satisfying the following expressions (1) and (2):

$$100 \text{ nm} \leq Re[590] \leq 350 \text{ nm} \quad (1)$$

$$0.2 \leq Rth[590]/Re[590] \leq 0.8 \quad (2).$$

The method of producing a retardation film according to the present invention allows control of a wide range of retardation values at a low stretch ratio when a polymer film containing a polycarbonate-based resin and a styrene-based resin is stretched, to thereby provide a wide retardation film having excellent mechanical strength. Therefore, a retardation film for a large liquid crystal display apparatus can be provided.

DESCRIPTION OF THE PREFERRED EMBODIMENTS

A. Retardation Film

Figure 1:
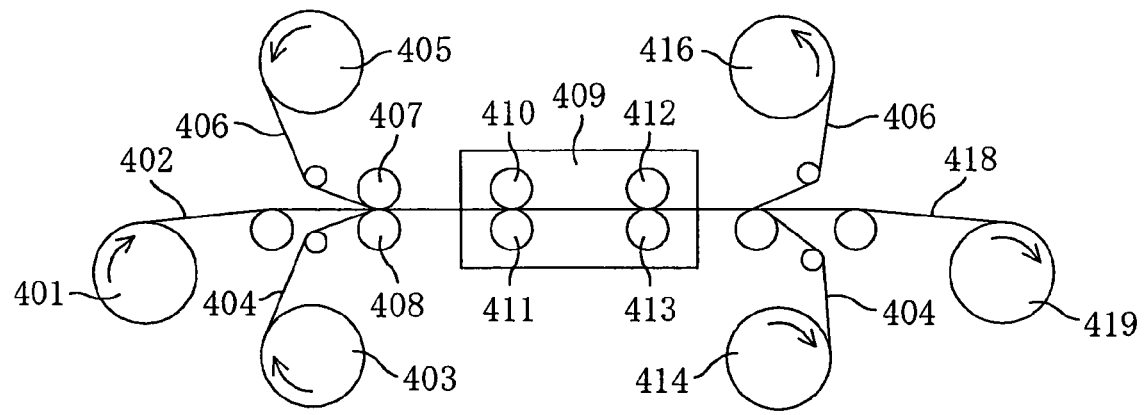
FIG. 1 is a schematic diagram explaining an example of a method of producing a retardation film according to the present invention.

A retardation film according to an embodiment of the present invention comprises a stretched polymer film containing a styrene-based resin and a polycarbonate-based resin, which satisfies the following expressions (1) and (2):

$$100 \text{ nm} \leq Re[590] \leq 350 \text{ nm} \quad (1)$$

$$0.2 \leq Rth[590]/Re[590] \leq 0.8 \quad (2).$$

In the expressions (1) and (2), Re[590] and Rth[590] respectively represent in-plane retardation and thickness direction retardation values of the film measured by using light of a wavelength of 590 nm at 23° C.

The styrene-based resin used in the present invention refers to a styrene-based polymer obtained through polymerization of a styrene-based monomer by any appropriate methods. Specific examples of the styrene-based monomer include styrene, a-methylstyrene, and 2,4-dimethylstyrene. In addition, a commercially available styrene-based resin or the like may be used. Specific examples thereof include a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer. Such a monomer or a resin may be used alone or in combination. Further, the styrene-based resin and the styrene-based monomer may be used in combination.

The styrene-based resin has a weight average molecular weight (Mw) of preferably less than 20,000, more preferably 1,000 to 10,000, particularly preferably 1,000 to 6,000, and most preferably 1,000 to 3,000 in polystyrene equivalents measured through a GPC method in which tetrahydrofuran is used as a developing solvent. When the styrene-based resin has a weight average molecular weight within the above ranges, the styrene-based resin and a polycarbonate-based resin may be mixed homogeneously, to thereby provide a highly transparent film.

A content of the styrene-based resin in the retardation film of the present invention is preferably 10 to 40 parts by weight, more preferably 20 to 40 parts by weight, particularly preferably 22 to 38 parts by weight, and most preferably 25 to 35 parts by weight with respect to 100 parts by weight of the total solid content. The styrene-based resin is used for reducing an absolute value of the photoelastic coefficient of the retardation film of the present invention. A content of the styrene-based resin within the above ranges can sufficiently reduce the photoelastic coefficient of the retardation film, and can assure a glass transition temperature (also referred to as Tg) or rigidity appropriate for durability, self-bearing property, stretch property, and the like. As a result, a retardation film hardly causing shift or unevenness in retardation values due to stress and having a refractive index profile of nx>nz>ny even when it is used for the liquid crystal display apparatus can be obtained.

The content of the styrene-based resin can be determined by subjecting retardation film containing a styrene-based resin and a polycarbonate-based resin to GPC measurement. To be specific, the retardation film is dissolved in tetrahydrofuran, to thereby prepare a 0.1 wt % solution which is left standing for 8 hours. Then, the solution is filtered through a 0.45 μm membrane filter, and a filtrate is measured through a gel permeation chromatograph (GPC) method. The obtained differential molecular weight distribution curve can be divided into a low molecular weight component and a high molecular weight component at a valley between peaks. The content of the styrene-based resin can be determined from an expression [total peak area of low molecular weight component/(total peak area of low molecular weight component+total peak area of high molecular weight component)]×100.

Aromatic polycarbonate composed of an aromatic dihydric phenol component and a carbonate component is preferably used as a polycarbonate-based resin used for the retardation film of the present invention. Aromatic polycarbonate can generally be obtained through a reaction between an aromatic dihydric phenol compound and a carbonate precursor. That is, aromatic polycarbonate can be obtained through: a phosgene method in which phosgene is blown into an aromatic dihydric phenol compound in the presence of caustic alkali and a solvent; or an ester exchange method in which an aromatic dihydric phenol compound and bisarylcabonate are subjected to ester exchange in the presence of a catalyst. Specific examples of the carbonate precursor include: phosgene; bischloroformates of dihydric phenols; diphenyl carbonate; di-p-tolyl carbonate; phenyl-p-tolyl carbonate; di-p-chlorophenyl carbonate; and dinaphthyl carbonate. Of those, phosgene and diphenyl carbonate are preferred.

Specific examples of the aromatic dihydric phenol compound to react with the carbonate precursor include: 2,2-bis(4-hydroxyphenyl)propane; 2,2-bis(4-hydroxy-3,5-dimethylphenyl)propane; bis(4-hydroxyphenyl)methane; 1,1-bis(4-hydroxyphenyl)ethane; 2,2-bis(4-hydroxyphenyl)butane; 2,2-bis(4-hydroxy-3,5-dimethylphenyl)butane; 2,2-bis(4-hydroxy-3,5-dipropylphenyl)propane; 1,1-bis(4-hydroxyphenyl)cyclohexane; and 1,1-bis(4-hydroxyphenyl)-3,3,5-trimethylcyclohexane. Aromatic dihydric phenol compound may be used alone or in combination. Preferred examples thereof include: 2,2-bis(4-hydroxyphenyl)propane; 1,1-bis(4-hydroxyphenyl)cyclohexane; and 1,1-bis(4-hydroxyphenyl)-3,3,5-trimethylcyclohexane. Particularly preferably, 2,2-bis(4-hydroxyphenyl)propane and 1,1-bis(4-hydroxyphenyl)-3,3,5-trimethylcyclohexane are used in combination, to thereby provide a retardation film having a sufficiently small photoelastic coefficient, and appropriate Tg and rigidity.

In a case where 2,2-bis(4-hydroxyphenyl)propane and 1,1-bis(4-hydroxyphenyl)-3,3,5-trimethylcyclohexane are used in combination as an aromatic dihydric phenol compound, the Tg or photoelastic coefficient of the retardation film can be adjusted by varying a ratio of 2,2-bis(4-hydroxyphenyl)propane to 1,1-bis(4-hydroxyphenyl)-3,3,5-trimethylcyclohexane to be used. For example, a high content of 1,1-bis(4-hydroxyphenyl)-3,3,5-trimethylcyclohexane in the polycarbonate-based resin can increase Tg and decrease the photoelastic coefficient. A weight ratio of 2,2-bis(4-hydroxyphenyl)propane to 1,1-bis(4-hydroxyphenyl)-3,3,5-trimethylcyclohexane in the polycarbonate-based resin is preferably 2:8 to 8:2, more preferably 3:7 to 6:4, particularly preferably 3:7 to 5:5, and most preferably 4:6. The combined use of 2,2-bis(4-hydroxyphenyl)propane and 1,1-bis (4-hydroxyphenyl)-3,3,5-trimethylcyclohexane in the above weight ratios can provide a retardation film having Tg and rigidity for excellent durability, self-bearing property, and stretch property.

In the present invention, the polycarbonate-based resin using as an aromatic dihydric phenol compound 2,2-bis(4-hydroxyphenyl)propane and 1,1-bis(4-hydroxyphenyl)-3,3,5-trimethylcyclohexane in combination is preferably used. Such polycarbonate-based resin contains repeating units represented by the following formulae (3) and (4):

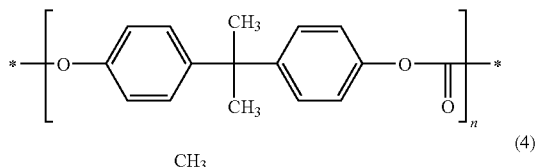

(3)

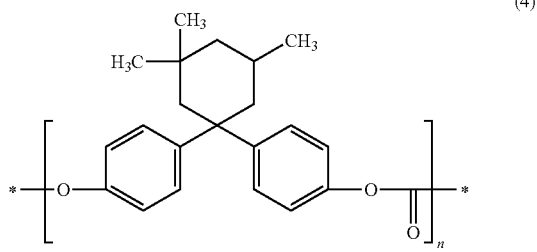

(4)

In the formulae (3) and (4), n represents an integer of 2 or more.

The polycarbonate-based resin used for the retardation film of the present invention has a weight average molecular weight (Mw) of preferably 25,000 to 200,000, more preferably 30,000 to 150,000, particularly preferably 40,000 to 100,000, and most preferably 50,000 to 80,000 in polystyrene equivalents measured through a GPC method in which tetrahydrofuran is used as a developing solvent. The polycarbonate-based resin having a weight average molecular weight within the above ranges can provide a retardation film having excellent mechanical strength.

A difference between the weight average molecular weights (Mw) of the polycarbonate-based resin and the styrene-based resin (Mw of polycarbonate-based resin—Mw of styrene-based resin) is preferably 24,000 to 92,000, more preferably 29,000 to 87,000, particularly preferably 39,000 to 77,000, and most preferably 49,000 to 67,000. A difference within the above ranges can provide a highly transparent retardation film having excellent mechanical strength.

As described above, the retardation film of the present invention is obtained by stretching (preferably heat stretching) the polymer film containing a polycarbonate-based resin and a styrene-based resin. A thickness of the polymer film before stretching may be appropriately set in accordance with designed retardation values, stretch property, ease of causing retardation, and the like. To be specific, the thickness of the polymer film before stretching is preferably 20 to 500 μm, more preferably 30 to 300 μm, particularly preferably 40 to 100 μm, and most preferably 50 to 80 μm. The thickness within the above ranges can provide sufficient self-bearing property of the film and a wide range of retardation values depending on the purpose.

The polymer film before stretching and the retardation film (stretched film) of the present invention each preferably have as high light transmittance as possible. To be specific, the light transmittance at a wavelength of 590 nm is preferably 80% or more, more preferably 85% or more, and particularly preferably 90% or more. A theoretical upper limit of the light transmittance is 100%, and a feasible upper limit thereof is 94%.

A glass transition temperature (Tg) of the polymer film is not particularly limited. The glass transition temperature (Tg) is preferably 110 to 185° C., more preferably 120 to 170° C., and particularly preferably 125 to 150° C. Tg of 110° C. or higher allows easy production of a film having good thermal stability. Tg of 185° C. or lower allows easy control of in-plane and thickness direction retardation values of the film by stretching. The glass transition temperature (Tg) can be determined through a DSC method in accordance with JIS K7121.

The polymer film can be obtained by: mixing a styrene-based resin and a polycarbonate-based resin; and forming the mixture into a film. Any appropriate mixing methods and forming methods may be employed. Specific examples of the forming method include a casting method from a solution and a melt extrusion method. The forming method is specifically described below. For example, in a case where a film is produced through a casting method, a styrene-based resin and a polycarbonate-based resin at a predetermined ratio are stirred and mixed with a solvent, to thereby prepare a homogeneous solution which is used for formation of a film. Meanwhile, in a case where a film is produced through a melt extrusion method, a styrene-based resin and a polycarbonate-based resin at a predetermined ratio are melted and mixed, and then extruded to form a film. The polymer film is preferably obtained through a casting method. The polymer film obtained through the casting method has good smoothness and good optical uniformity.

Examples of the solvent to be used in the casting method include: aromatic hydrocarbons such as benzene, toluene, xylene, methoxybenzene, and 1,2-dimethoxybenzene; halogenated hydrocarbons such as chloroform, dichloromethane, carbon tetrachloride, dichloroethane, tetrachloroethane, trichloroethylene, tetrachloroethylene, chlorobenzene, and orthodichlorobenzene; phenols such as phenol and parachlorophenol; ethers such as diethyl ether, dibutyl ether, tetrahydrofuran, anisole, and dioxane; ketones such as acetone, methyl isobutyl ketone, methyl ethyl ketone, cyclohexanone, cyclopentanone, 2-pentanone, 3-pentanone, 2-hexanone, 3-hexanone, 2-heptanone, 3-heptanone, 4-heptanone, 2,6-dimethyl-4-heptanone, 2-pyrrolidone, and N-methyl-2-pyrrolidone; alcohols such as n-butanol, 2-butanol, cyclohexanol, isopropyl alcohol, t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amides such as dimethylformamide and dimethylacetamide; nitriles such as acetonitrile and butyronitrile; cellosolves such as methyl cellosolve and methyl cellosolve acetate; esters such as ethyl acetate, butyl acetate, and methyl lactate; methylene chloride; carbon disulfide; ethyl cellosolve; and butyl cellosolve. Such solvent may be used alone or in combination.

Examples of a preferred solvent include dichloromethane, chloroform, 1,2-dichloroethane, cyclopentanone, cyclohexanone, methyl isobutyl ketone, methyl ethyl ketone, diglyme, toluene, ethyl acetate, tetrahydrofuran, 1,3-dioxolane, 1,4-dioxane, and chlorobenzene. Examples of a particularly preferred solvent include tetrahydrofuran and dichloromethane. Those are particularly excellent in solubility and dope stability.

A total solid content in the solution used for the casting method may be appropriately set in accordance with solubilities of the resins, application viscosity, wettability on a substrate, thickness after application, and the like. To be specific, the total solid content is preferably 2 to 100 parts by weight, more preferably 4 to 50 parts by weight, and particularly preferably 5 to 40 parts by weight with respect to 100 parts by weight of the solvent. The concentration of the total solid content within the above ranges can provide a polymer film with good smoothness.

The polymer film may contain any appropriate additives as required without impairing the object of the present invention. Specific examples of the additive include a stabilizer, a plasticizer, an ultraviolet absorber, and an antistatic agent.

As described above, the retardation film of the present invention is a stretched film of the polymer film. In the specification of the present invention, the term "stretched film" refers to a film prepared by applying tension to an unstretched film at an appropriate temperature to enhance orientation of molecules along a stretching direction. Further, the term "stretched film" includes a film prepared by further applying tension to a film stretched in advance to enhance orientation of molecules along a stretching direction.

A thickness of the retardation film (stretched film) is preferably 22 to 550 μm, more preferably 33 to 330 μm, particularly preferably 44 to 110 μm, and most preferably 55 to 88 μm. The thickness within the above ranges can provide self-bearing property of the film and a wide range of retardation values depending on the purpose.

In the specification of the present invention, Re[590] refers to an in-plane retardation value measured by light of a wavelength of 590 nm at 23° C. Re[590] can be determined from an equation Re[590]=(nx−ny)×d (wherein, nx and ny respectively represent refractive indices of the film in a slow axis direction and a fast axis direction at a wavelength of 590 nm, and d (nm) represents a thickness of the film). Note that, the slow axis refers to a direction providing a maximum in-plane refractive index.

The retardation film of the present invention has Re[590] of 100 to 350 nm as described by the expression (1), preferably 200 to 350 nm, more preferably 240 to 300 nm, particularly preferably 260 to 280 nm, and most preferably 265 to 275 nm. Re[590] is adjusted to about ½ of the measuring wavelength, to thereby enhance display properties of the liquid crystal display apparatus.

In the specification of the present invention, Rth[590] refers to a thickness direction retardation value measured by light of a wavelength of 590 nm at 23° C. Rth[590] can be determined from an equation Rth[590]=(nx−nz)×d (wherein, nx and nz respectively represent refractive indices of the film in a slow axis direction and a thickness direction at a wavelength of 590 nm, and d (nm) represents a thickness of the film).

The retardation film of the present invention has Rth[590] of preferably 35 to 190 nm, more preferably 90 to 190 nm, particularly preferably 100 to 165 nm, and most preferably 120 to 155 nm.

Re[590] and Rth[590] may be determined by using "KOBRA-21ADH" (trade name, manufactured by Oji Scientific Instruments). Refractive indices nx, ny, and nz can be determined by: using an in-plane retardation value (Re) of the film measured at a wavelength of 590 nm at 23° C., a retardation value (R40) measured by inclining a slow axis by 40° as a tilt angle, a thickness (d) of the retardation film, and an average refractive index (n0) of the retardation film; and using the following equations (i) to (vi) for computational numerical calculation. Then, Rth can be calculated from the following equation (iv). Here, φ and ny' are represented by the following respective equations (v) and (vi).

$$Re=(nx-ny) \times d \qquad (i)$$

$$R40=(nx-ny') \times d/\cos(\phi) \qquad (ii)$$

$$(nx+ny+nz)/3=n0 \qquad (iii)$$

$$Rth=(nx-nz) \times d \qquad (iv)$$

$$\phi=\sin^{-1}[\sin(40°)/n0] \qquad (v)$$

$$ny'=ny \times nz/[ny^2 \times \sin^2(\phi)+nz^2 \times \cos^2(\phi)]^{1/2} \qquad (vi)$$

In the specification of the present invention, Rth[590]/Re[590] refers to a ratio (also referred to as Nz coefficient) of a thickness direction retardation value to an in-plane retardation value measured by using light of a wavelength of 590 nm at 23° C.

Rth[590]/Re[590] of the retardation film of the present invention is 0.2 to 0.8 as described by the expression (2), preferably 0.2 to 0.7, more preferably 0.2 to 0.6, particularly preferably 0.4 to 0.6, and most preferably 0.45 to 0.55. Rth[590]/Re[590] of the retardation film is adjusted closer to 0.5, to thereby realize property of substantially constant retardation values regardless of angles and further improved is play properties of the liquid crystal display apparatus. Further, Rth[590]/Re[590] is adjusted to be more than 0 and less than 1, to thereby provide a retardation film having a refractive index profile of nx>nz>ny.

The photoelastic coefficient of the retardation film generally refers to ease of causing birefringence when external force is applied to an optical film to cause internal stress. An absolute value of photoelastic coefficient of the retardation film is preferably small, to thereby provide excellent optical uniformity and inhibit unevenness in retardation due to distortion or the like. The photoelastic coefficient can be determined by: using a spectroscopic ellipsometer "M-220" (trade name, manufactured by JASCO Corporation); measuring an in-plane retardation value of a sample piece of 2 cm×10 cm under stress by using light of a wavelength of 590 nm at 23° C.; and calculating the photoelastic coefficient from a slope of a function of the retardation value and the stress.

An absolute value of photoelastic coefficient C[590](m²/N) of the retardation film of the present invention measured by using light of a wavelength of 590 nm at 23° C. is preferably $2.0 \times 10^{-11}$ to $8.0 \times 10^{-11}$, more preferably $2.0 \times 10^{-11}$ to $6.0 \times 10^{-11}$, particularly preferably $3.0 \times 10^{-11}$ to $6.0 \times 10^{-11}$, and most preferably $4.0 \times 10^{-11}$ to $6.0 \times 10^{-11}$. A photoelastic coefficient within the above ranges can provide a retardation film hardly causing shift or unevenness in retardation values due to shrinkage stress of the polarizer or heat of backlight and having a refractive index profile of nx>nz>ny.

The wavelength dispersion property of the retardation film generally refers to wavelength dependence of retardation values. The wavelength dispersion property can be represented by a ratio of in-plane retardation values Re[480]/Re[590] measured by using light of wavelengths of 480 nm and 590 nm at 23° C.

Wavelength dispersion property Re[480]/Re[590] of the retardation film of the present invention is preferably 1.02 to 1.30, more preferably 1.02 to 1.20, and particularly preferably 1.02 to 1.10. Smaller wavelength dispersion property within the above ranges provides constant retardation values in a wide region of visible light. As a result, a contrast ratio and color shift of the liquid crystal panel can be significantly improved. Note that, Re[480] and Re[590] respectively represent in-plane retardation values measured by using light of wavelengths of 480 nm and 590 nm at 23° C.

Variation in direction (alignment angle) of a slow axis of the retardation film is preferably as small as possible. Large variation may cause reduction in degree of polarization when the retardation film is laminated on a polarizer or polarizing plate. A range of variation in alignment angle among five points of measurement provided at equal intervals in a width direction of the film is preferably ±2.0° to ±1.0°, more preferably ±1.0° to ±0.5°, and particularly preferably ±0.5 to ±0.1. Note that, the alignment angle can be determined by using "KOBRA-21ADH" (trade name, manufactured by Oji Scientific Instruments), for example.

B. Method of Producing Retardation Film

A method of producing a retardation film according to the present invention includes: attaching a shrinkable film to one side or both sides of a polymer film containing a styrene-based resin and a polycarbonate-based resin; and heat stretching the resultant.

The shrinkable film is used for providing shrinkage force in a direction perpendicular to a stretching direction during heat stretching, and for increasing a refractive index of the retardation film to be obtained in a thickness direction. Examples of a material used for the shrinkable film include polyester, polystyrene, polyethylene, polypropylene, polyvinyl chloride, and polyvinylidene chloride. A polypropylene film is preferably used from the viewpoints of excellent shrinkage uniformity and thermal resistance.

The shrinkable film is preferably a stretched film such as a biaxially stretched film or a uniaxially stretched film. The shrinkable film can be obtained by: forming an unstretched film through an extrusion method; and stretching the unstretched film in a machine and/or transverse direction at a predetermined stretch ratio by using a simultaneous biaxial stretching machine or the like. The forming and stretching conditions may be appropriately selected in accordance with the purpose, compositions or kinds of resins to be used, and the like. A biaxially stretched polypropylene film is particularly preferably used from the view points of excellent shrinkage uniformity and thermal resistance.

In one embodiment of the present invention, the shrinkable film has a shrinkage ratio in a longitudinal direction of the film $S^{140}(MD)$ of 2.7 to 9.4%, and a shrinkage ratio in a width direction of the film $S^{140}(TD)$ of 4.6 to 15.8% at 140° C. $S^{140}(MD)$ is more preferably 2.7 to 8.7%, particularly preferably 3.7 to 7.7%, and most preferably 4.7 to 6.7%. $S^{140}(TD)$ is more preferably 4.6 to 10.6%, particularly preferably 5.6 to 9.6%, and most preferably 6.6 to 8.6%. Shrinkage ratios within the above ranges can provide intended retardation values and a retardation film having excellent uniformity.

In another embodiment of the present invention, the shrinkable film has a shrinkage ratio in a longitudinal direction of the film $S^{160}(MD)$ of 13 to 23%, and a shrinkage ratio in a width direction of the film $S^{160}(TD)$ of 30 to 48% at 160° C. $S^{160}(MD)$ is more preferably 15 to 21%, particularly preferably 16 to 20%, and most preferably 17 to 19%. $S^{160}(TD)$ is more preferably 31 to 44%, particularly preferably 32 to 40%, and most preferably 33 to 38%. Shrinkage ratios within the above ranges can provide intended retardation values and a retardation film having excellent uniformity.

In one embodiment of the present invention, a difference $\Delta S^{140}=S^{140}(TD)-S^{140}(MD)$ between the shrinkage ratio in a width direction of the film $S^{140}(TD)$ and the shrinkage ratio in a longitudinal direction of the film $S^{140}(MD)$ preferably falls within a range of $0.1\% \leq \Delta S^{140} \leq 3.9\%$ at 140° C. The difference $\Delta S^{140}$ is more preferably 0.9 to 2.9%, particularly preferably 1.4 to 2.4%, and most preferably 1.8 to 2.1%. A large shrinkage ratio in an MD direction may cause difficulties in uniform stretching due to shrinkage force of the retardation film on a stretching machine, in addition to stretching tension. A difference within the above ranges allows uniform stretching without applying excess load to facilities such as a stretching machine.

In another embodiment of the present invention, a difference $\Delta S^{160}=S^{160}(TD)-S^{160}(MD)$ between the shrinkage ratio in a width direction of the film $S^{160}(TD)$ and the shrinkage ratio in a longitudinal direction of the film $S^{140}(MD)$ falls within a range of $8\% < \Delta S^{160} \leq 30\%$ at 160° C. The difference $\Delta S^{160}$ is more preferably 10 to 28%, particularly preferably 12 to 26%, and most preferably 14 to 22%. A large shrinkage ratio in an MD direction may cause difficulties in uniform stretching due to shrinkage force of the retardation film on a stretching machine, in addition to stretching tension. A difference within the above ranges allows uniform stretching without applying excess load to facilities such as a stretching machine.

The shrinkable film preferably has a shrinkage stress per 2 mm in a width direction $T_A^{140}(TD)$ of 0.15 to 0.75 N/2 mm at 140° C. The stress $T_A^{140}(TD)$ is more preferably 0.15 to 0.70 N/2 mm, particularly preferably 0.25 to 0.65 N/2 mm, and most preferably 0.35 to 0.55 N/2 mm. The shrinkable film preferably has a shrinkage stress per unit area in a width direction $T_B^{140}(TD)$ of 2.5 to 12.5 N/mm² at 140° C. A shrinkage stress within the above ranges can provide intended retardation values and allows uniform stretching.

The shrinkable film preferably has a shrinkage stress per 2 mm in a width direction $T_A^{150}(TD)$ of 0.20 to 0.85 N/2 mm at 150° C. The stress $T_A^{150}(TD)$ is more preferably 0.25 to 0.80 N/2 mm, particularly preferably 0.35 to 0.75 N/2 mm, and most preferably 0.45 to 0.65 N/2 mm. The shrinkable film preferably has a shrinkage stress per unit area in a width direction $T_B^{150}(TD)$ of 3.3 to 14.2 N/mm² at 150° C. A shrinkage stress within the above ranges can provide intended retardation values and allows uniform stretching.

The shrinkage ratios S(MD) and S(TD) can be determined in accordance with a heat shrinkage ratio A method of JIS Z1712 (except that: a heating temperature is changed from 120° C. to 140° C. or 160° C. as described above; and a load of 3 g is added to a sample piece). To be specific, five samples having a width of 20 mm and a length of 150 mm are sampled from a longitudinal direction (machine direction MD) and a width direction (transverse direction TD), respectively. The sample pieces are each marked at a distance of about 100 mm at a center. The sample pieces each with a load of 3 g are hung vertically into an air-circulating thermostatic bath maintained at 140° C.±3° C. or 160° C.±3° C. The sample pieces are heated for 15 min, taken out of the thermostatic bath, and left standing under standard conditions (room temperature) for 30 min. Then, the distances between marks are measured by using a caliper in accordance with JIS B7507, to thereby obtain an average of five measured values. A shrinkage ratio can be calculated from an equation S (%)=[(distance between marks (mm) before heating−distance between marks (mm) after heating)/distance between marks (mm) before heating]× 100.

A commercially available shrinkable film used for applications such as general packaging, food packing, pallet wrapping, shrinkable labels, cap seals, and electrical insulation can be appropriately selected and used as the above-described shrinkable film as long as the purpose of the present invention can be satisfied. The commercially available shrinkable film may be used as it is, or may be used after the shrinkable film is subjected to fabrication such as stretching treatment or shrinking treatment. Specific examples of the commercially available shrinkable film include: "ALPHAN" (trade name,. available from Oji paper Co., Ltd.); "FANCYTOP series" (trade name, available from Gunze Ltd.); "TORAYFAN series" (trade name, available from Toray Industries, Inc.); "SUN-TOX-OP series" (tradename, available from SUN-TOX Co., Ltd.); and "TOHCELLO OP series" (trade name, available from TOHCELLO Co., Ltd.).

The shrinkable film before heat stretching may have any appropriate thickness in accordance with the shrinkage ratio, retardation values, and the like. To be specific, the thickness is preferably 10 to 500 μm, more preferably 20 to 300 μm, particularly preferably 30 to 100 μm, and most preferably 40 to 80 μm. The thickness within the above ranges can provide a sufficient shrinkage ratio, to thereby allow production of a retardation film having good optical uniformity.

The shrinkable film is attached to the polymer film such that a shrinkage direction of the shrinkable film includes at least a component of a direction perpendicular to a stretching direction. That is, the shrinkable film is attached to the polymer film such that shrinkage force of the shrinkable film entirely or partly acts in a direction perpendicular to the stretching direction of the polymer film. Thus, a shrinkage direction of the shrinkable polymer may be oblique to the stretching direction of the polymer film, and need not be perfectly perpendicular thereto.

Any appropriate methods may be employed as a method of attaching the shrinkable film. For example, a preferred method thereof involves bonding of the polymer film and the shrinkable film by providing a pressure sensitive adhesive layer therebetween. The method is excellent in workability and productivity. The pressure sensitive adhesive layer may be formed on one or both of the polymer film and the shrinkable film. The shrinkable film is generally peeled off after the retardation film is produced. Thus, a preferred pressure sensitive adhesive has excellent adhesiveness and thermal resistance during a heat stretching step, is easily peeled off in the subsequent peeling step, and does not remain on a surface of the retardation film. The pressure sensitive adhesive layer is preferably formed on the shrinkable film, to thereby provide excellent releasability.

Examples of the pressure sensitive adhesive forming the pressure sensitive adhesive layer include an acrylic pressure sensitive adhesive, a synthetic rubber-based pressure sensitive adhesive, a rubber-based pressure sensitive adhesive, and a silicone-based pressure sensitive adhesive. An acrylic pressure sensitive adhesive having an acrylic polymer as a base polymer is preferred for excellent adhesiveness, thermal resistance, and releasability. The acrylic polymer has a weight average molecular weight (Mw) of preferably 30,000 to 2,500,000 in polystyrene equivalents. Note that, the weight average molecular weight (Mw) is calculated through a GPC method in which tetrahydrofuran is used as a developing solvent.

Examples of a monomer to be used for the acrylic polymer include various alkyl (meth)acrylates. Specific examples thereof include alkyl (meth)acrylates having 1 to 20 carbon atoms such as methyl (meth)acrylate, ethyl (meth)acrylate, propyl (meth)acrylate, butyl (meth)acrylate, 2-ethylhexyl (meth)acrylate, isooctyl (meth)acrylate, isononyl (meth)acrylate, isodecyl (meth)acrylate, dodecyl (meth)acrylate, lauryl (meth)acrylate, tridecyl (meth)acrylate, pentadecyl (meth)acrylate, hexadecyl (meth) acrylate, heptadecyl (meth) acrylate, octadecyl (meth)acrylate, nonadecyl (meth)acrylate, and eicosyl (meth)acrylate. Such monomer can be used independently or in combination.

In one embodiment of the present invention, the acrylic polymer to be obtained is provided with polarity. For example, a method of providing polarity involves copolymerization of the alkyl (meth)acrylate and a predetermined monomer. Examples of the monomer to be used in the copolymerization include: carboxyl group-containing monomers such as (meth) acrylic acid and itaconic acid; hydroxyl group-containing monomers such as hydroxyethyl (meth)acrylate and hydroxypropyl (meth)acrylate; amide group-containing monomers such as N-methylolacrylamide; cyano group-containing monomers such as (meth)acrylonitrile; epoxy group-containing monomers such as glycidyl (meth)acrylate; vinyl esters such as vinyl acetate; and styrene-based monomers such as styrene and α-methylstyrene.

Any appropriate methods may be employed as a method of polymerizing an acrylic polymer. Specific examples thereof include solution polymerization, emulsion polymerization, suspension polymerization, and UV polymerization.

In another embodiment of the present invention, the pressure sensitive adhesive (composition) may further contain a crosslinking agent. Examples of the crosslinking agent include a polyisocyanate compound, a polyamine compound, a melamine resin, a urea resin, and an epoxy resin. The pressure sensitive adhesive may contain any appropriate additives as required. The kind and amount of additive may be selected, to thereby form a pressure sensitive adhesive layer having appropriate adhesive strength and/or other properties depending on the purpose. Specific examples of the additive include a catalyst, a tackifier (natural resin or synthetic resin, for example), a plasticizer, a filler, an antioxidant, an ultraviolet absorber, and a silane coupling agent.

Any appropriate methods may be employed as a method of forming a pressure sensitive adhesive layer. Specific examples thereof include a direct application method and a transfer method. The direct application method involves: direct application of a pressure sensitive adhesive on the shrinkable film; and drying of the resultant. The transfer method involves: application of a pressure sensitive adhesive on a release film; drying of the resultant; and transferring of the pressure sensitive adhesive onto the shrinkable film from the release film.

The pressure sensitive adhesive layer may have any appropriate thickness in accordance with adhesive strength, surface state of the retardation film, and the like. To be specific, the thickness is preferably 1 to 100 ηm, more preferably 5 to 50 μm, and particularly preferably 10 to 30 μm. The thickness within the above ranges can provide a sufficient shrinkage ratio, to thereby allow production. of a retardation film having good optical uniformity. The pressure sensitive adhesive layer may be formed by laminating a plurality of adhesives of different kinds and/or having different compositions.

A separator is temporarily attached onto an exposed surface of the pressure sensitive adhesive layer to cover the surface until practical use. In this way, contamination of the pressure sensitive adhesive layer can be prevented when an operator or the like touches the pressure sensitive adhesive layer in handling. Any appropriate release papers or release films may be employed as the separator. A specific example thereof includes release paper or release film prepared by coating a thin substrate with a release agent. Examples of the substrate include a plastic film, a rubber sheet, paper, a fabric, a nonwoven fabric, a net, a foamed sheet, a metallic foil, and laminates thereof. Examples of the release agent include a silicone-based release agent, a long-chain alkyl-based release agent, a fluorine-based release agent, and a molybdenum sulfide release agent.

The adhesive strength at an interface between the polymer film and the pressure sensitive adhesive layer at 23° C. is not particularly limited without impairing the effects of the present invention. To be specific, the adhesive strength is preferably 0.1 to 10.0 N/50 mm, more preferably 0.1 to 5.0 N/50 mm, and particularly preferably 0.2 to 3.0 N/50 mm. The adhesive strength can be measured by: preparing a sample for measuring adhesive strength through press contact of the shrinkable film onto the polymer film by rolling a manual roller to and fro 3 times on the shrinkable film in accordance with JIS Z0237; subjecting the sample to autoclave treatment (50° C., 15 min, 5 kg/cm$^2$); and measuring adhesive strength through a peeling method (pulling speed: 300 mm/min) at 90° in accordance with JIS Z0237 by using an apparatus in accordance with JIS B7721. The adhesive strength can be controlled through any appropriate systems. Examples thereof include: a system which provides any appropriate surface treatment such as corona treatment or plasma treatment on a surface of the polymer film to be provided with a pressure sensitive adhesive layer; a system which provides any appropriate treatment such as heat treatment or autoclave treatment on the polymer film in a state where the shrinkable film is attached thereto; and a combination of the systems.

Any appropriate number of shrinkable films, that is, one, or two or more shrinkable films may be attached to one side or both sides of the polymer film in accordance with designed shrinkage force, intended optical properties, and the like. In a case where a plurality of shrinkable films are used (for example, in a case where a plurality of shrinkable films are attached to both sides or in a case where a plurality of shrinkable films are attached to one side), shrinkage ratios of the respective shrinkable films may be appropriately set depending on the purpose. Thus, the shrinkage ratios of the respective shrinkable films may be the same or may be different from each other.

Next, the polymer film having the shrinkable film attached thereto (hereinafter, referred to as a laminate) is stretched (typically heat stretched). Any appropriate stretching methods may be employed as long as the method is capable of applying tension in a stretching direction of the polymer film and shrinkage force in a direction perpendicular to the stretching direction. Specific examples thereof include: a vertical uniaxial stretching method; a transverse uniaxial stretching method; a vertical and transverse simultaneous biaxial stretching method; and a vertical and transverse sequential biaxial stretching method. The stretching is performed by using any appropriate stretching machines. Specific examples of the stretching machine include: a roll stretching machine; a tenter; and a biaxial stretching machine. The stretching may be performed in one stage, or may be performed in two or more stages. A stretching direction may be in a longitudinal direction (machine direction MD) or width direction (transverse direction TD) of the film. Alternatively, the stretching direction may be in an oblique direction by using a stretching method described in FIG. 1 of JP 2003-262721 A.

A temperature during stretching of the laminate (stretching temperature) is preferably a glass transition temperature (Tg) of the polymer film or higher because retardation values of the retardation film to be obtained easily even out, and the film hardly crystallizes (becomes clouded). The stretching temperature is more preferably (Tg of the polymer film +1° C.) to (Tg+30° C.), furthermore preferably (Tg+2° C.) to (Tg+20° C.), particularly preferably (Tg+3° C.) to (Tg+15° C.), and most preferably (Tg+5° C.) to (Tg+10° C.). The stretching temperature within the above ranges allows uniform heat stretching. The stretching temperature is preferably constant in a width direction of the film, to thereby produce a retardation film having small variation in retardation values and good optical uniformity.

Any appropriate temperature control means may be employed as means for maintaining a constant stretching temperature. Specific examples thereof include: an air-circulating thermostatic oven in which hot air, cool air, or the like circulates; a heater using microwave or far infrared rays; a heated or cooled roller for temperature adjustment; and heating or cooling means using a heat pipe roller or a metallic belt.

The stretching temperature preferably varies as little as possible (typically, variation in width direction of the film). Large variation may cause stretching unevenness to a great extent, to thereby cause variation in retardation values of the retardation film to be obtained eventually. Variation of the stretching temperature in a width direction of the film is preferably ±3.0° C. or less, and particularly preferably ±1.0° C. or less.

A stretch ratio during the stretching may be appropriately set in accordance with the content of the styrene-based resin to be used for the polymer film, the kind of a volatile component or the like, a residual amount of the volatile component or the like, designed retardation values, and the like. To be specific, the stretch ratio is preferably 1.05 to 2.00 times, more preferably 1.10 to 1.50 times, particularly preferably 1.20 to 1.40 times, and most preferably 1.25 to 1.30 times. The stretch ratio within the above ranges can provide a retardation film having little shrinkage in width of the film and excellent mechanical strength.

A delivery speed of the laminate during the stretching is not particularly limited. The delivery speed is preferably 0.5 m/min or more, and more preferably 1 m/min or more in consideration of the machine accuracy, stability, and the like of the stretching machine.

An example of a method of producing a retardation film according to the present invention will be described with reference to FIG. 1. FIG. 1 is a schematic diagram showing a concept of a typical production process of the retardation film of the present invention. For example, a polymer film 402 containing a styrene-based resin and a polycarbonate-based resin is delivered from a first delivery part 401. A shrinkable film 404 provided with a pressure sensitive adhesive layer and delivered from a second delivery part 403, and a shrinkable film 406 provided with a pressure sensitive adhesive layer and delivered from a third delivery part 405 are attached to both sides of the polymer film 402 by laminate rollers 407 and 408. A laminate having the shrinkable film attached to both sides of the polymer film is subjected to stretching treatment while the laminate is maintained at a constant temperature by drying means 409 under tension in a longitudinal direction of the film by rollers 410, 411, 412, and 413 at different speed ratios (under tension in a thickness direction by the shrinkable film at the same time) The shrinkable films 404 and 406 together with the pressure sensitive adhesive layers are peeled off from the laminate subjected to stretching treatment at a first take-up part 414 and a second take-up part 416, to thereby obtain a retardation film (stretched film) 418. The obtained retardation film 418 is taken-up at a third take-up part 419.

C. Combined Use of Retardation Film of the Present Invention and Other Retardation Film The retardation film according to the present invention may be laminated on another retardation film through a pressure sensitive adhesive, an adhesive, or the like and such laminate may be used for image display apparatus. As the other retardation film to be used in combination with the retardation film of the present invention, a retardation film having any appropriate optical properties, chemical properties, and mechanical properties can be used depending on the purpose. Specific examples of a material for the other retardation film include: polyester-based resins such as polyethylene terephthalate and polyethylene naphthalate; cellulose-based resins such as diacetyl cellulose and triacetyl cellulose; acryl resins such as polymethyl methacrylate; styrene-based resins such as polystyrene, an acrylonitrile/styrene copolymer, a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer; and polycarbonate-based resins. Further examples thereof include: polyolefin-based resins such as a cycloolefin-based resin, a norbornene-based resin, polyethylene, polypropylene, and an ethylene/propylene copolymer; vinyl chloride-based resins; an amide-based resins such as nylon and aromatic polyamide; an imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; epoxy-based resins. A film prepared by providing birefringent property to a polymer film formed of a blended product of the above-described resins and a film prepared by applying a mixed solution containing a liquid crystalline compound on a substrate and curing the resultant are also exemplified. The birefringent property may generate spontaneously during formation of the polymer film, or may be provided by subjecting the polymer film to uniaxial or biaxial stretching.

Any appropriate birefringent property may be employed as the birefringent property of the other retardation film in accordance with birefringent property of the retardation film of the present invention, display mode of a liquid crystal display apparatus to be used, and the like. In a case where the other retardation film is used for a liquid crystal display apparatus of TN mode, IPS mode, FFS mode, VA mode, or OCB mode, examples of the other retardation film preferably used include: a uniaxial retardation film having Re[590]=80 to 140 nm (Rth[590]/Re[590]=0.9 to 1.3); a negative uniaxial retardation film having Re[590]=0 to 5 nm and Rth[590]=90 to 400 nm; a uniaxial inclined aligned retardation film having an optical axis inclined at 10 to 80° with respect to a normal of a substrate; a biaxial retardation film having Re[590]=30 to 60 nm (Rth[590]/Re[590]=2.0 to 6.0); a biaxial retardation film having Re[590]=100 to 300 nm (Rth[590]/Re[590]=0.2 to 0.8); and a hybrid aligned retardation film having discotic liquid crystal molecules or rod-like liquid crystal molecules gradually inclined with respect to a normal of a substrate. Such a retardation film is used in combination with the retardation film of the present invention, to thereby improve viewing angle properties of a liquid crystal display apparatus.

D. Optical Film

An optical film according to the present invention includes a polarizer, and the retardation film according to the present invention laminated on at least one side of the polarizer. The polarizer and the retardation film are laminated by any appropriate means (through a pressure sensitive adhesive layer or an adhesive layer, for example). The optical film of the present invention may include single retardation film of the present invention, or may include two or more retardation films laminated. In a case where two or more retardation films are laminated, the retardation films may be the same or different from each other. In a case where different retardation films are laminated, optical properties of each retardation film may be appropriately set depending on the purpose. For example, in an embodiment of the optical film according to the present invention, the retardation film is a λ/2 plate. In this case, a λ/2 plate as a single layer may be used as the retardation film, or two λ/4 plates may be arranged such that respective slow axes are substantially parallel to each other and be collectively used as the retardation film. The optical film of the present invention may further include another appropriate retardation film (other retardation film described in the above section C, for example) as required.

In another embodiment of the present invention, the optical film of the present invention further includes a transparent protective film on at least one side of the polarizer. In this case, the retardation film of the present invention is typically laminated on the polarizer on the opposite side of the transparent protective film. In still another embodiment of the present invention, the optical film of the present invention includes the transparent protective film on both sides of the polarizer, and the retardation film of the present invention is laminated on at least one transparent protective film. In other words, the optical film of the present invention includes the retardation film of the present invention laminated on at least one polarizing plate (generally includes a polarizer and a transparent protective film laminated on at least one side of the polarizer). In a case where the transparent protective film is provided on both sides of the polarizer, the transparent protective films may be formed of the same material or of different materials.

In the optical film of the present invention, a slow axis of the retardation film is preferably substantially parallel or perpendicular to an absorption axis of the polarizer. In the specification of the present invention, the phrase "substantially parallel" includes a case where a slow axis of the retardation film and an absorption axis of the polarizer form an angle of 0°±2.0°, preferably 0°±1.0°, and more preferably 0°±0.5°. In the specification of the present invention, the phrase "substantially perpendicular" includes a case where a slow axis of the retardation film and an absorption axis of the polarizer form an angle of 90°±2.0°, preferably 90°±1.0°, and more preferably 90°±0.5°. An angle greatly departing from the above ranges may cause degradation in degree of polarization of the polarizing plate, and degradation of contrast when the optical film is used for a liquid crystal display apparatus.

Figure 2:
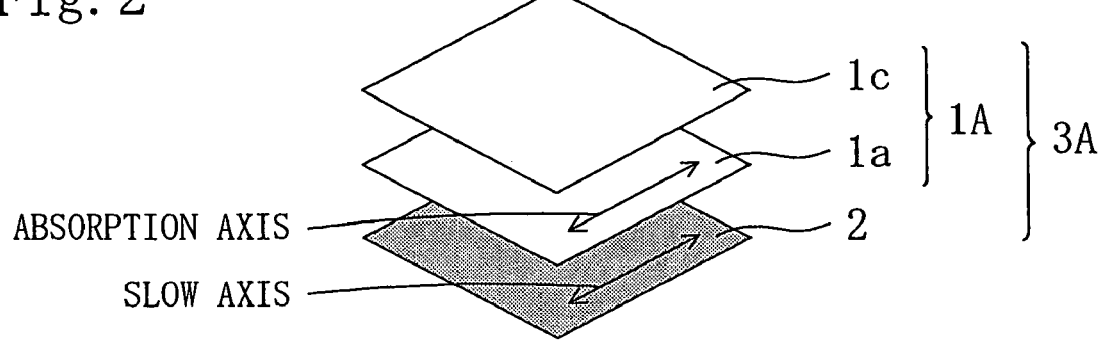
FIG. 2 is a schematic diagram showing an example of an optical film according to the present invention.

Hereinafter, a specific construction of the optical film of the present invention will be exemplified with reference to figures. FIG. 2 is a schematic perspective view explaining an optical film according to a preferred embodiment of the present invention. In an optical film 3A of FIG. 2, a transparent protective film 1c is arranged on one side of a polarizer 1a, and a retardation film 2 of the present invention is arranged on the other side of the polarizer 1a. That is, the optical film 3A of FIG. 2 has the retardation film 2 laminated to a polarizing plate 1A (including the polarizer 1a and the transparent protective film 1c). FIG. 2 shows a case where a slow axis of the retardation film 2 is parallel to an absorption axis of the polarizer 1a, but the slow axis of the retardation film 2 may be perpendicular thereto.

Figure 3:
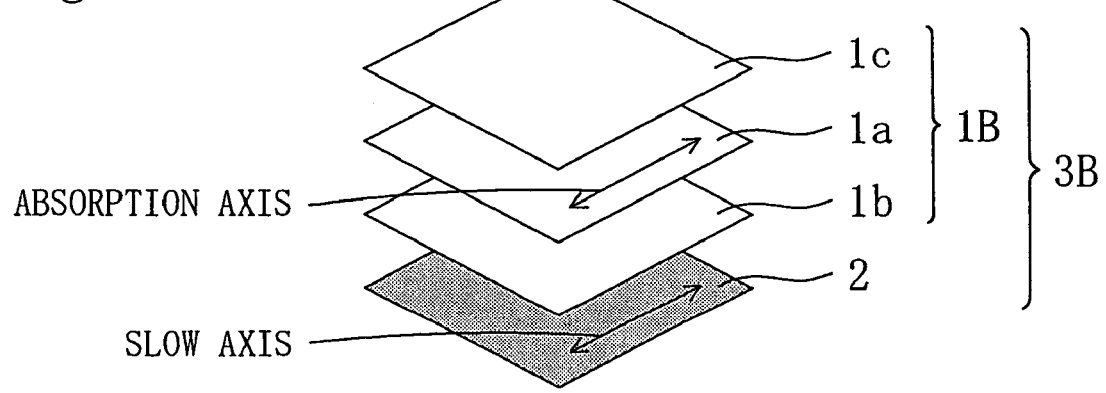
FIG. 3 is a schematic diagram showing another example of an optical film according to the present invention.

FIG. 3 is a schematic perspective view explaining an optical film according to another embodiment of the present invention. In an optical film 3B of FIG. 3, transparent protective films 1b and 1c are arranged on both sides of the polarizer 1a, and the retardation film 2 is arranged on the transparent protective film 1b on the opposite side of the polarizer 1a. That is, the optical film 3B of FIG. 3 has the retardation film 2 laminated to a polarizing plate 1B (including the polarizer 1a and the transparent protective films 1b and 1c). FIG. 3 shows a case where a slow axis of the retardation film 2 is parallel to an absorption axis of the polarizer 1a, but the slow axis of the retardation film 2 may be perpendicular thereto.

Figure 4:
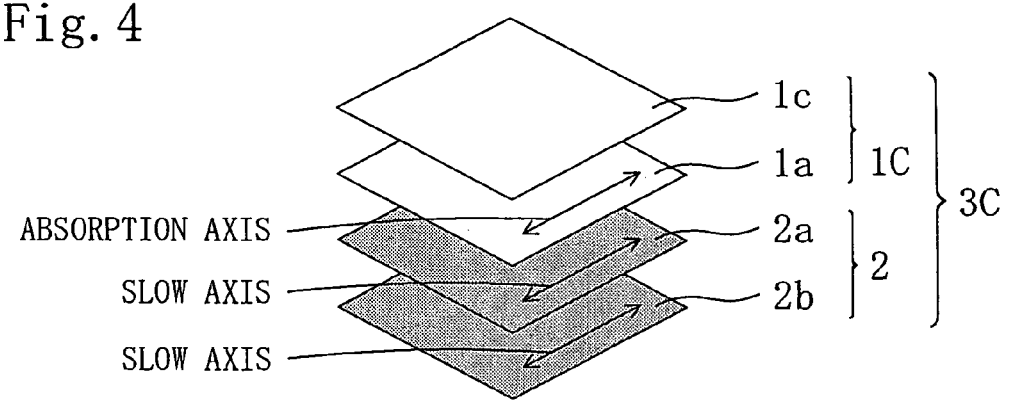
FIG. 4 is a schematic diagram showing still another example of an optical film according to the present invention.

FIG. 4 is a schematic perspective view explaining an optical film according to still another embodiment of the present invention. In an optical film 3C of FIG. 4, the transparent protective film 1c is arranged on one side of the polarizer 1a, and two retardation film 2a and 2b of the present invention are arranged on the other side of the polarizer 1a. That is, the optical film 3C of FIG. 4 has the two retardation films 2a and 2b laminated to a polarizing plate 1C (including the polarizer 1a and the transparent protective film 1c). FIG. 4 shows a case where slow axes of the retardation films 2a and 2b are each parallel to an absorption axis of the polarizer 1a, but the slow axes of the retardation films 2a and 2b may each be perpendicular thereto. Further, FIG. 4 shows a case where the slow axes of the retardation films 2a and 2b are parallel to each other, but the slow axes of the retardation films 2a and 2b may be perpendicular to each other depending on the purpose.

Figure 5:
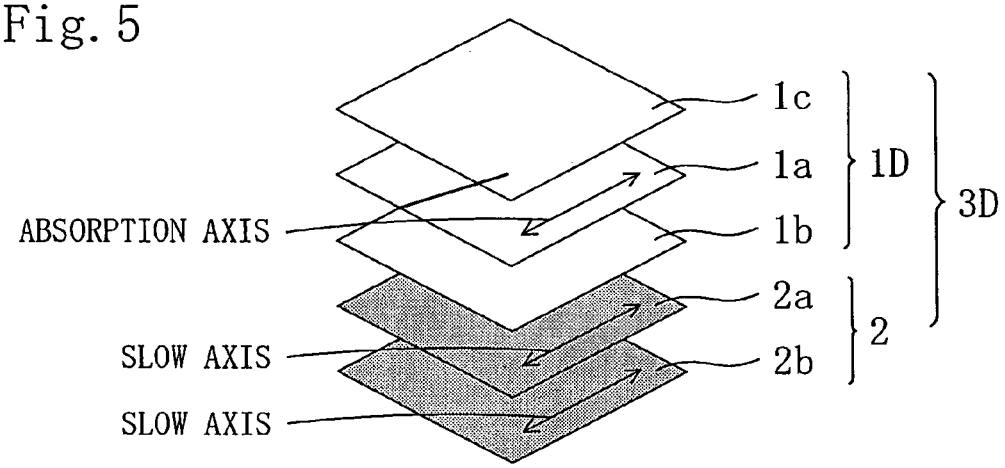
FIG. 5 is a schematic diagram showing yet another example of an optical film according to the present invention.

FIG. 5 is a schematic perspective view explaining an optical film according to yet another embodiment of the present invention. In an optical film 3D of FIG. 5, the transparent protective films 1b and 1c are arranged on both sides of the polarizer 1a, and two retardation film 2a and 2b of the present invention are arranged on the transparent protective film 1b on the opposite side of the polarizer 1a. That is, the optical film 3D of FIG. 5 has the two retardation films 2a and 2b laminated to a polarizing plate 1D (including the polarizer 1a and the transparent protective films 1b and 1c). FIG. 5 shows a case where slow axes of the retardation films 2a and 2b are each parallel to an absorption axis of the polarizer 1a, but the slow axes of the retardation films 2a and 2b may each be perpendicular thereto. Further, FIG. 5 shows a case where the slow axes of the retardation films 2a and 2b are parallel to each other, but the slow axes of the retardation films 2a and 2b may be perpendicular to each other depending on the purpose.

Any appropriate polarizers may be employed as the polarizer used in the optical film of the present invention in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based orientation film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred because of high polarized dichromaticity. A thickness of the polarizer is not particularly limited, but is generally about 5 to 80 µm. The polarizers arranged on both sides of the liquid crystal cell may be the same or different from each other.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washing away of an antiblocking agent, but also provides an effect of preventing unevenness such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

The transparent film preferably has excellent transparency, mechanical strength, thermal stability, water shielding property, stability of retardation value, and the like. Examples of a material for forming the transparent film include: polyester-based resins such as polyethylene terephthalate and polyethylene naphthalate; cellulose-based resins such as diacetyl cellulose and triacetyl cellulose; acrylic resins such as polymethyl methacrylate; styrene-based resins such as polystyrene, an acrylonitrile/styrene copolymer, a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer; and polycarbonate-based resins. Further examples thereof include: cycloolefin-based resins; norbornene-based resin; polyolefin-based resins such as polyethylene, polypropylene, and an ethylene/propylene copolymer; vinyl chloride-based resins; amide-based resins such as nylon and aromatic polyamide; imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; and epoxy-based resins. Still further examples thereof include polymer films composed of blended products of the above-described resins. The transparent protective film can also be formed as a cured layer of an acryl, urethane-based, acryl urethane-based, epoxy-based, or silicone-based heat-curable resin or UV-curable resin.

A cellulose-based resin such as triacetyl cellulose or a norbornene-based resin is preferably used as the transparent protective film because of excellent polarization property, durability, and the like. Specific examples of the cellulose-based resin include "FUJITAC" (trade name, available from Fuji Photo Film Co., Ltd.). Specific examples of the norbornene-based resin include "ZEONOR" (trade name, available from Zeon Corporation) and "ARTON" (trade name, available from JSR Corporation).

A thickness of the transparent protective film may be appropriately set depending on the purpose. The transparent protective film typically has a thickness of about 1 to 500 µm. Such thickness allows excellent workability such as handling property and excellent strength, and contribution in thickness reduction of a liquid crystal display apparatus. The thickness of the transparent protective film is more preferably 5 to 200 µm, and particularly preferably 10 to 150 µm. The thickness within the above ranges mechanically protects the polarizer, prevents shrinkage of the polarizer even when the polarizer is exposed to high temperature and high humidity environment, and provides maintained stable optical properties.

The transparent protective film to be used preferably has optimized optical properties, to thereby substantially eliminate the effects of the film on viewing angle properties of a liquid crystal display apparatus. To be specific, the birefringence and photoelastic coefficient of the transparent protective film are preferably as small as possible. A transparent protective film arranged between a polarizer and a liquid crystal cell desirably has optimized retardation values. In contrast, a transparent protective film arranged on the outer side of the polarizer (far side from the liquid crystal cell) provides no effect on optical properties of the liquid crystal display apparatus and thus need not have optimized retardation values.

In the optical film of the present invention, the retardation film is generally arranged on a side of the liquid crystal cell. Thus, in the optical film of the present invention, the transparent protective film (transparent protective film 1b of FIGS. 3 and 5, for example) on which the retardation film is laminated preferably has optimized optical properties.

The transparent protective film (in particular, a transparent protective film on which the retardation film of the present invention is laminated) preferably satisfies the following expressions (5) and (6):

$$0 \text{ nm} < Re[590] \leq 5 \text{ nm} \quad (5)$$

$$0 \text{ nm} < Rth[590] \leq 10 \text{ nm} \quad (6).$$

As described in the expression (5), Re[590] of the transparent protective film is preferably more than 0 nm and 5 nm or less, more preferably more than 0 nm and 3 nm or less, particularly preferably more than 0 nm and 2 nm or less, and most preferably more than 0 nm and 1 nm or less. As described in the expression (6), Rth[590] of the transparent protective film is preferably more than 0 nm and 10 nm or less, more preferably more than 0 nm and 6 nm or less, particularly preferably more than 0 nm and 4 nm or less, and most preferably more than 0 nm and 3 nm or less. The in-plane retardation Re[590] and thickness direction retardation Rth[590] within the above ranges can provide good display properties without adversely affecting the display properties such as contrast ratio and color shift when the transparent protective film is used for the liquid crystal display apparatus.

An absolute value of the photo elastic coefficient C[590] ($m^2/N$) of the transparent protective film measured by using light of a wavelength of 590 nm at 23° C. is preferably $2.0 \times 10^{-13}$ to $2.0 \times 10^{-11}$, more preferably $5.0 \times 10^{-13}$ to $8.0 \times 10^{-12}$, particularly preferably $2.0 \times 10^{-12}$ to $6.0 \times 10^{-12}$, and most preferably $2.0 \times 10^{-12}$ to $5.0 \times 10^{-12}$.

The retardation film of the present invention has a smaller photoelastic coefficient than that of a conventional aromatic polymer film. Thus, even when the retardation film of the present invention is directly laminated (actually through an adhesive or a pressure sensitive adhesive) on a polarizer, the retardation film hardly causes shift or unevenness in retardation values due to shrinkage stress of the polarizer or heat of backlight when it is used for the liquid crystal display apparatus, to thereby provide good display properties. However, the retardation film of the present invention having a very small photoelastic coefficient is preferably laminated on a surface of the transparent protective film having optimized optical properties as described above (to be specific, a transparent protective film having small birefringence or photoelastic coefficient). As a result, shrinkage stress of the polarizer or heat of backlight transmitted to the retardation film can be reduced, to thereby further reduce shift or unevenness in retardation values.

Specific examples of a material for the transparent protective film having small photoelastic coefficient and birefringence include: a norbornene-based resin described in JP 06-51117A prepared by subjecting a ring-opening (co)polymer of a norbornene-based monomer to polymer modification such as maleic acid addition or cyclopentadiene addition as required and hydrogenating the modified product; a norbornene-based resin prepared through addition polymerization of a norbornene-based monomer; and a norbornene-based resin prepared through addition copolymerization of a norbornene-based monomer and an olefin-based monomer (such as ethylene or α-olefin). Another example thereof includes a cycloolefin-based resin described in JP 2002-348324 A prepared through polymerization of at least one of a polycyclic cycloolefin monomer such as norbornene, a monocyclic cycloolefin monomer, and an acyclic 1-olefin monomer in a form of solution, suspension, or molten monomer, or in a gas phase under the presence of a metallocene catalyst.

Further examples thereof include: a polycarbonate-resin described in JP 2001-253960 A having 9,9-bis(4-hydroxyphenyl)fluorene on a side chain; and a cellulose-based resin described in JP 07-112446A. Another example thereof includes a polymer film described in JP 2001-343529 A, that is, a film obtained from a resin composition containing a thermoplastic resin (A) having a substituted and/or unsubstituted imide group on a side chain, and a thermoplastic resin (B) having substituted and/or unsubstituted phenyl and nitrile groups on a side chain. A specific example thereof is a polymer film obtained from a resin composition containing an alternating copolymer of isobutylene and N-methylmaleimide, and an acrylonitrile/styrene copolymer. Further examples thereof include: a random copolymer of a monomer forming a polymer exhibiting positive birefringence and a monomer forming a polymer exhibiting negative birefringence, described in "Development and applied technology of optical polymer material" (p.194 top.207, published by NTS Inc., 2003); and a polymer doped with anisotropic low molecular weight molecules and/or birefringent crystals.

A method of laminating the transparent protective film and the polarizer is not particularly limited. For example, the transparent protective film and the polarizer may be laminated through: an adhesive containing an acrylic polymer or a vinyl alcohol-based polymer; or an adhesive containing a vinyl alcohol-based polymer and a water-soluble crosslinking agent to the vinyl alcohol-based polymer such as boric acid or borax, gultaldehyde, melamine, or oxalic acid. The use of such an adhesive prevents peeling of the polarizer and the transparent protective film due to humidity or heat, to thereby provide an optical film having excellent light transmittance or degree of polarization. The polyvinyl alcohol-based adhesive is preferably used because of excellent adhesiveness with polyvinyl alcohol, which is a raw material for the polarizer.

In a case where a polymer film containing a norbornene-based resin is used as the transparent protective film, a pressure sensitive adhesive for laminating the film and the polarizer is preferably a pressure sensitive adhesive which has excellent transparency, which has small birefringence or the like, and which can exhibit sufficient adhesive strength even when the transparent protective film is used as a thin layer. Examples of the adhesive that can be used include: an adhesive for dry lamination prepared by mixing a polyurethane-based resin solution and a polyisocyanate resin solution; a styrene/butadiene rubber-based adhesive; and an epoxy-based two-component curable adhesive (adhesive composed of two components of an epoxy resin solution and a polythiol solution; an adhesive composed of two components of an epoxy resin solution and a polyamide solution; or the like). A solvent adhesive, and an epoxy-based two component curable adhesive is preferred, and a transparent adhesive is more preferred. Some adhesives may improve adhesive strength by using an appropriate adhesion primer, and such adhesives preferably use the adhesion primer.

Any appropriate primers capable of forming a layer with improved adhesiveness may be employed as the adhesion primer. Specific examples of the primer include: so-called coupling agents such as a silane-based coupling agent having a reactive functional group (such as an amino group, a vinyl group, an epoxy group, a mercapto group, or a chloro group) and an hydrolytic alkoxysilyl group in a molecule, a titanate-based coupling agent having a hydrolytic hydrophilic group containing titanium and an organic functional group in a molecule, and an aluminate-based coupling agent having a hydrolytic hydrophilic group containing aluminum and an organic functional group in a molecule; and resins each having an organic reactive group such as an epoxy-based resin, an isocyanate-based resin, a urethane-based resin, and an ester urethane-based resin. Of those, the silane-coupling agent is preferred from the viewpoint of ease in industrial handling.

The optical film is preferably provided with an adhesive layer or a pressure sensitive adhesive layer on both sides or one side thereof for easy lamination of the optical film to a liquid crystal cell.

The adhesive layer or the pressure sensitive adhesive layer is not particularly limited. The adhesive forming the adhesive layer and/or the pressure sensitive adhesive forming the pressure sensitive adhesive layer may be appropriately selected. Examples thereof include those each containing as a base polymer a polymer such as an acrylic copolymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based or a synthetic rubber-based polymer). In particular, an acrylic pressure sensitive adhesive is preferably used from the viewpoint of excellent optical transparency, adhesive property including moderate wettability, cohesiveness and adhesiveness, and excellent weatherability and thermal resistance.

The adhesive or the pressure sensitive adhesive may contain a crosslinking agent in accordance with the base polymer. Further, the adhesive or the pressure sensitive adhesive may contain any appropriate additives depending on the purpose. Specific examples of the additive include: resins such as a natural resin and a synthetic resin; glass fiber and glass beads; fillers composed of metallic powder or other inorganic powder; pigments; colorants; and antioxidants. In an embodiment of the present invention, a pressure sensitive adhesive layer containing transparent fine particles may be formed to exhibit light diffusion property.

Examples of the transparent fine particles include: inorganic fine particles which has an average particle size of 0.5 to 20 µm and which may have electrical conductivity such as silica, calcium oxide, alumina, titania, zirconia, tin oxide, indium oxide, cadmium oxide, and antimony oxide; and crosslinked or non-crosslinked organic fine particles composed of any appropriate polymer such as polymethyl methacrylate or polyurethane. Such transparent fine particles may be used independently or two or in combination.

The adhesive or the pressure sensitive adhesive is generally used in a form of an adhesive solution or dispersion prepared by dissolving or dispersing a base polymer or a base polymer composition into a solvent and having a concentration of solid content of about 10 to 50 wt %. Any appropriate solvents (organic solvent such as toluene or ethyl acetate, or water, for example) may be used as the solvent in accordance with the kind of adhesive.

The adhesive or the pressure sensitive adhesive may form a laminate of adhesive layers and/or pressure sensitive adhesive layers with different compositions, kinds, or the like. A thickness of the adhesive (layer) or pressure sensitive adhesive (layer) may be determined in accordance with intended use, adhesive strength, and the like, and is preferably 1 to 50 µm, more preferably 5 to 200 µm, and particularly preferably 10 to 100 µm.

A separator is temporarily attached onto an exposed surface of the adhesive layer, the pressure sensitive adhesive layer, or the like to cover the surface until practical use. In this way, contamination of the pressure sensitive adhesive layer can be prevented when an operator or the like touches the pressure sensitive adhesive layer in handling. Specific examples of the separator include those described above regarding attaching of the shrinkable film.

The surface of the transparent protective layer without a polarizer attached may be subjected to hard coat treatment, antireflection treatment, anti-sticking treatment, or diffusion treatment (also referred to as anti-glare treatment).

The hard coat treatment is performed for prevention of damages on a surface of a polarizing plate, and a curable coated film with excellent hardness, slip property, and the like may be formed on the surface of the transparent protective film by using any appropriate UV-curable resin such as an acrylic resin or a silicone-based resin. The antireflection treatment is performed for antireflection of outside light at the surface of the polarizing plate. The anti-sticking treatment is performed for prevention of adherence of the polarizing plate with an adjoining layer. The anti-glare treatment is performed for prevention of reflection of outside light at the surface of the polarizing plate to disturb visual recognition of light transmitting through the polarizing plate, and the treatment maybe performed, for example, by providing a fine uneven structure on the surface of the transparent protective film through any appropriate system such as surface roughening system by sandblasting or embossing or a system of mixing transparent fine particles. An anti-glare layer formed through the anti-glare treatment may also serve as a diffusion layer (viewing angle expanding function, for example) for diffusing light transmitting through the polarizing plate and expanding a viewing angle or the like.

Next, description is given of another optical member used in combination with the retardation film or optical film of the present invention. The other optical member is not particularly limited, and an example thereof includes an optical film subjected to the hard coat treatment, antireflection treatment, anti-sticking treatment, or diffusion treatment (also referred to as anti-glare treatment). Another example thereof includes a reflective polarizing plate or transflective polarizing plate prepared by laminating a reflective plate or transflective plate on an elliptically or circularly polarizing plate. Still another example thereof includes a reflective elliptically polarizing plate or transflective elliptically polarizing plate prepared by combining the reflective polarizing plate or transflective polarizing plate with a retardation plate. In a case where the retardation plate or optical film of the present invention is used for transmissive or transflective liquid crystal display apparatus, the retardation plate or optical film of the present invention may be used in combination with a commercially available brightness enhancement film (polarization separation film having a polarization selection layer, D-BEF, manufactured by 3M company, for example), to thereby obtain a display apparatus having better display properties.

The optical film of the present invention may be formed by sequentially laminating separate layers in a production process of the liquid crystal display apparatus, or maybe put into practical use in a form of laminate film having layers laminated in advance. The optical film is preferably used as a laminate film because of excellent stability in quality and excellent workability, to thereby allow improvement in production efficiency of the liquid crystal display apparatus or the like.

E. Liquid Crystal Panel

A liquid crystal panel according to the present invention includes: the retardation film of the present invention or the optical film of the present invention; and a liquid crystal cell. Hereinafter, specific examples thereof will be described.

Figure 6:
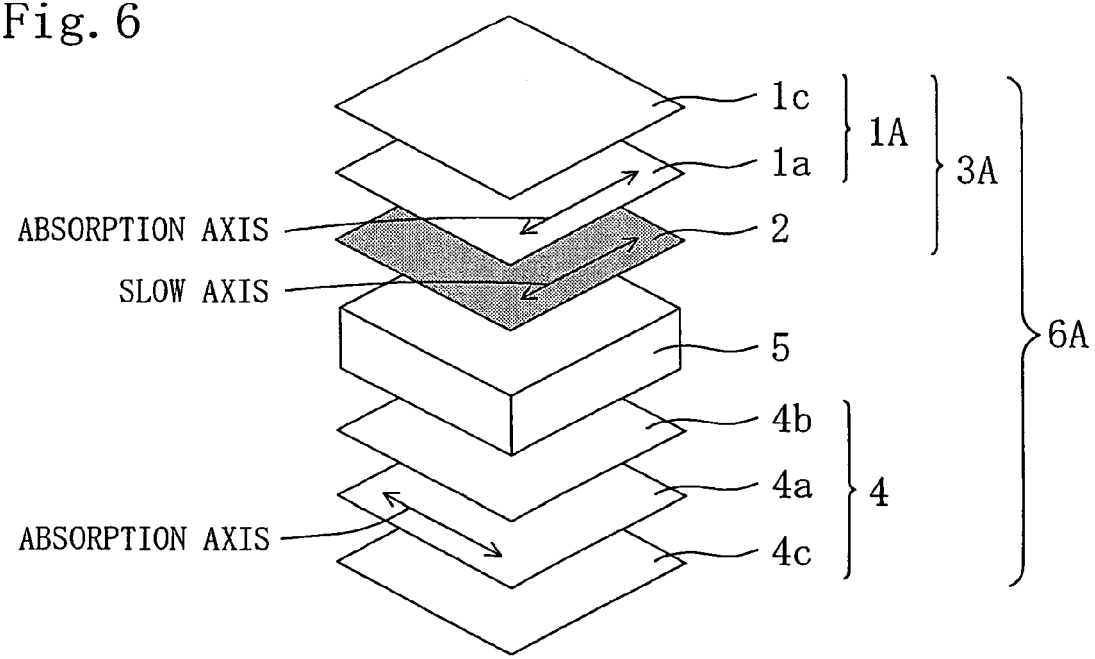
FIG. 6 is a schematic diagram showing an example of a liquid crystal panel according to the present invention.

In a liquid crystal panel 6A of FIG. 6, the optical film 3A (including the transparent protective film 1c, the polarizer 1a, and the retardation film 2 of the present invention) is arranged on one side of a liquid crystal cell 5 such that the retardation film 2 is closer to the liquid crystal cell 5. A polarizing plate 4 (including transparent protective films 4b and 4c on both sides of a polarizer 4a) is arranged on the other side of the liquid crystal cell 5 such that the transparent protective film 4b is closer to the liquid crystal cell 5. FIG. 6 shows a case where a slow axis of the retardation film 2 is parallel to an absorption axis of the polarizer 1a, but the slow axis of the retardation film 2 may be perpendicular thereto.

Figure 7:
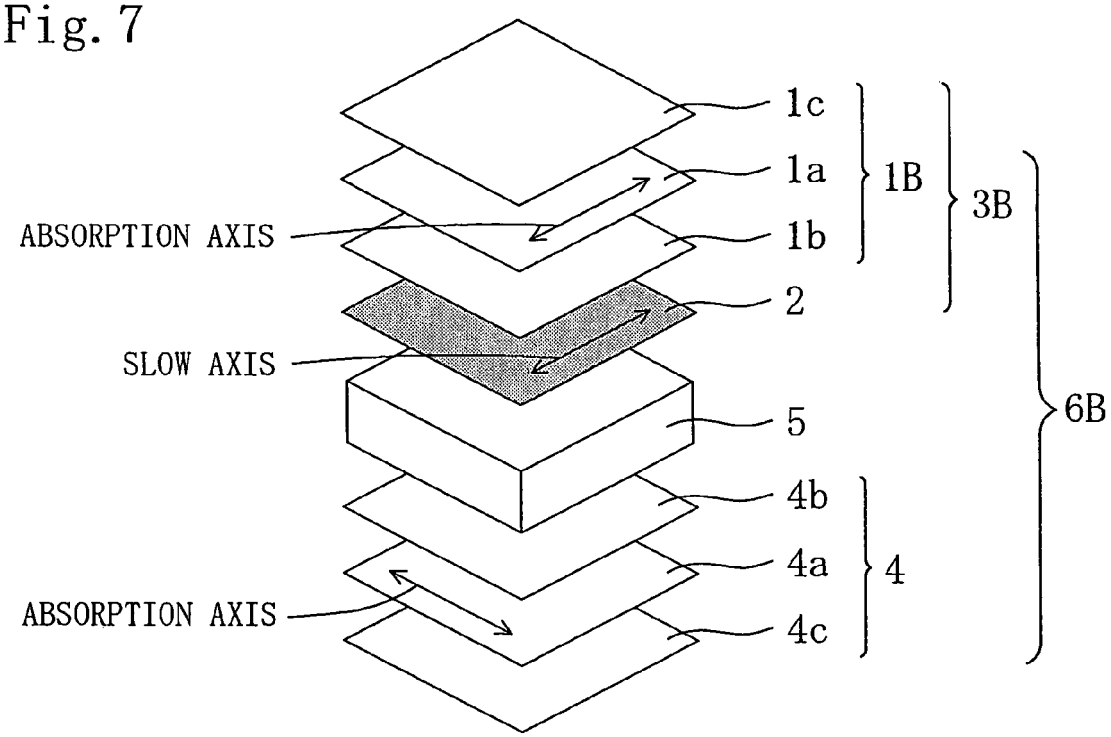
FIG. 7 is a schematic diagram showing another example of a liquid crystal panel according to the present invention.

In a liquid crystal panel 6B of FIG. 7, the optical film 3B (including the transparent protective film 1c, the polarizer 1a, the transparent protective film 1b, and the retardation film 2 of the present invention) is arranged on one side of the liquid crystal cell 5 such that the retardation film 2 is closer to the liquid crystal cell 5. The polarizing plate 4 (including the transparent protective films 4b and 4c on both sides of the polarizer 4a) is arranged on the other side of the liquid crystal cell 5 such that the transparent protective film 4b is closer to the liquid crystal cell 5. FIG. 7 shows a case where a slow axis of the retardation film 2 is parallel to an absorption axis of the polarizer 1a, but the slow axis of the retardation film 2 may be perpendicular thereto.

Figure 8:
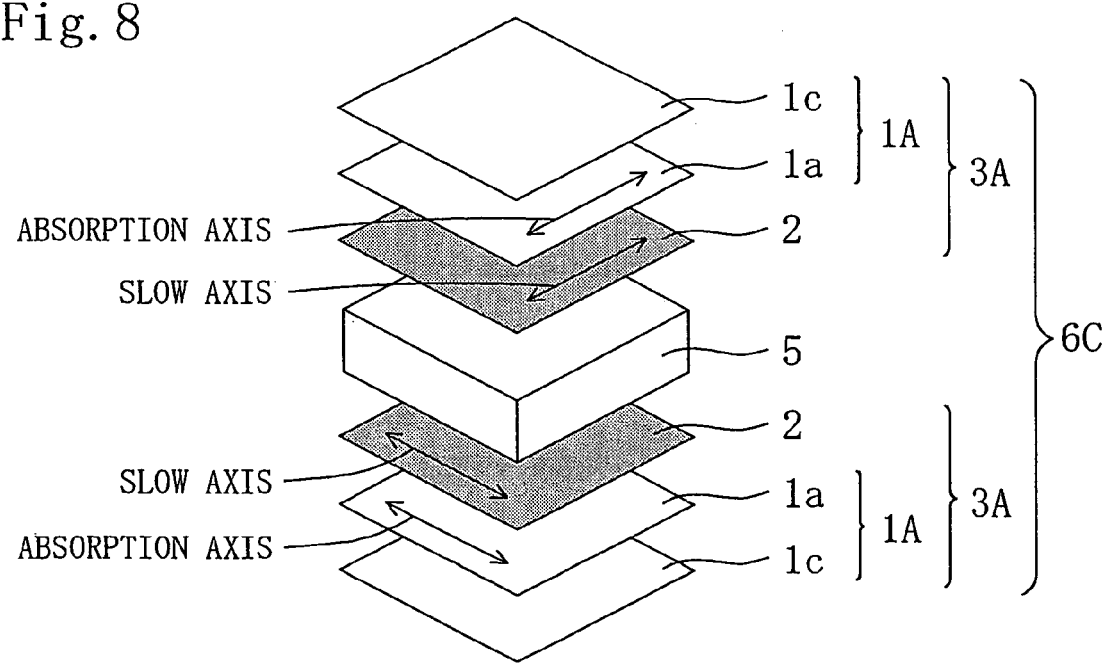
FIG. 8 is a schematic diagram showing still another example of a liquid crystal panel according to the present invention.

In a liquid crystal panel 6C of FIG. 8, the optical film 3A (including the transparent protective film 1c, the polarizer 1a, and the retardation film 2 of the present invention) is arranged on both sides of the liquid crystal cell 5 such that each retardation film 2 is closer to the liquid crystal cell 5. Slow axes of the retardation films 2 are arranged to be perpendicular to each other. FIG. 8 shows a case where the slow axis of each retardation film 2 in the optical film is parallel to an absorption axis of the polarizer 1a, but the slow axis of each retardation film 2 may be perpendicular thereto.

Figure 9:
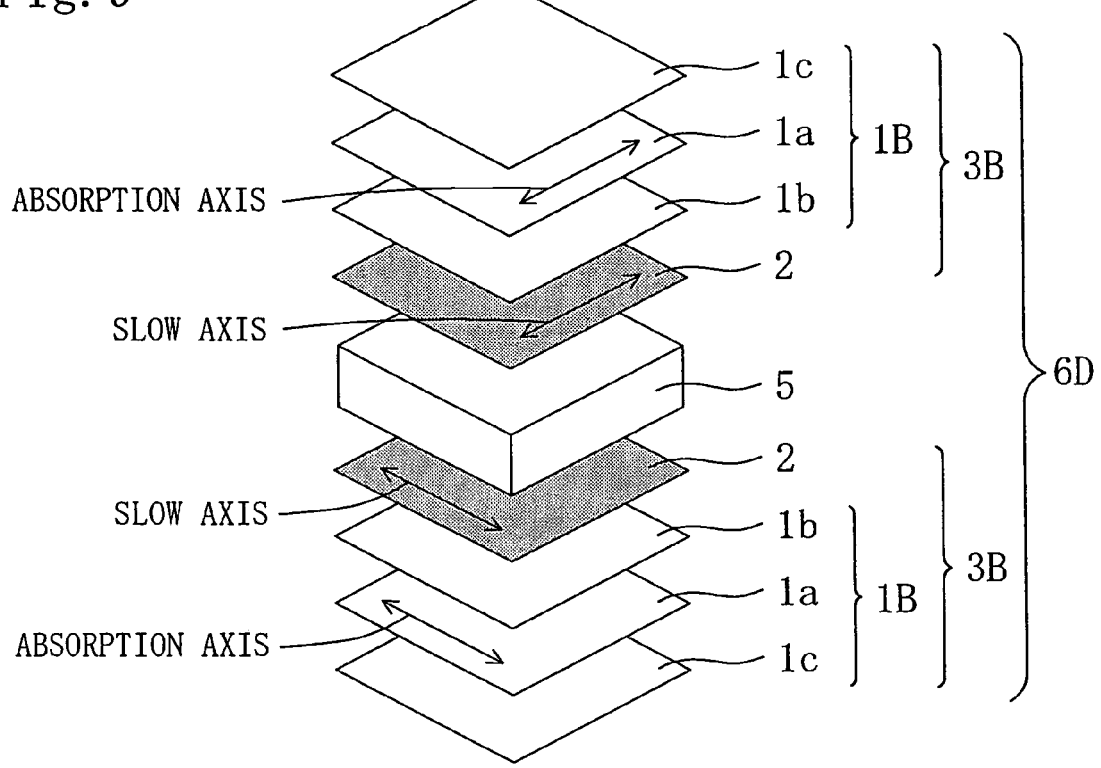
FIG. 9 is a schematic diagram showing yet another example of a liquid crystal panel according to the present invention.

In a liquid crystal panel 6D of FIG. 9, the optical film 3B (including the transparent protective film 1c, the polarizer 1a, the transparent protective film 1b, and the retardation film 2 of the present invention) is arranged on both sides of the liquid crystal cell 5 such that each retardation film 2 is closer to the liquid crystal cell 5. Slow axes of the retardation films 2 are arranged to be perpendicular to each other. FIG. 9 shows a case where the slow axis of each retardation film 2 in the optical film is parallel to an absorption axis of the polarizer 1a, but the slow axis of each retardation film 2 may be perpendicular thereto.

Figure 10:
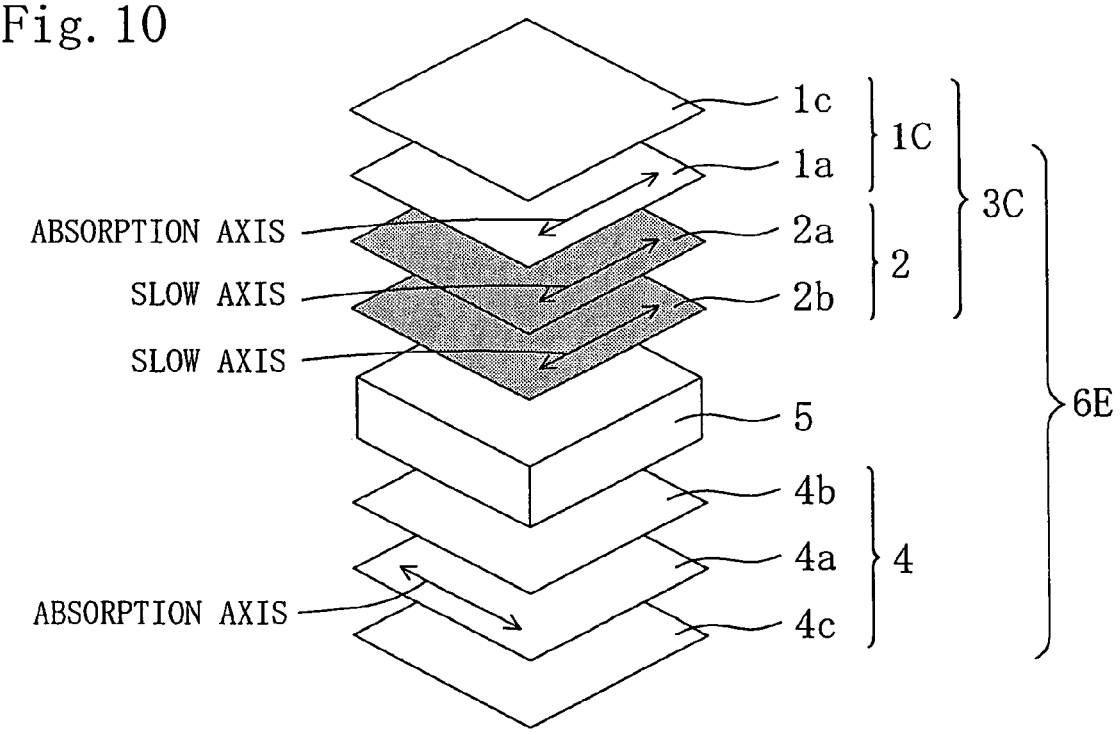
FIG. 10 is a schematic diagram showing still yet another example of a liquid crystal panel according to the present invention.

FIG. 10 shows a liquid crystal panel 6E in which the retardation film of the present invention is a laminate. In the liquid crystal panel 6E of FIG. 10, the optical film 3C (including the transparent protective film 1c, the polarizer 1a, and the retardation film 2 of the present invention including two retardation films 2a and 2b) is arranged on one side of the liquid crystal cell 5 such that the retardation films 2 are closer to the liquid crystal cell 5. The polarizing plate 4 (including the transparent protective films 4b and 4c on both sides of the polarizer 4a) is arranged on the other side of the liquid crystal cell 5 such that the transparent protective film 4b is closer to the liquid crystal cell 5. FIG. 10 shows a case where slow axes of the retardation films 2a and 2b are parallel to each other in a laminate, but the slow axes thereof may be perpendicular to each other. Further, FIG. 10 shows a case where the slow axes of the retardation films 2 (2a and 2b) are each parallel to an absorption axis of the polarizer 1a, but the slow axes of the retardation films 2 may be perpendicular thereto.

Figure 11:
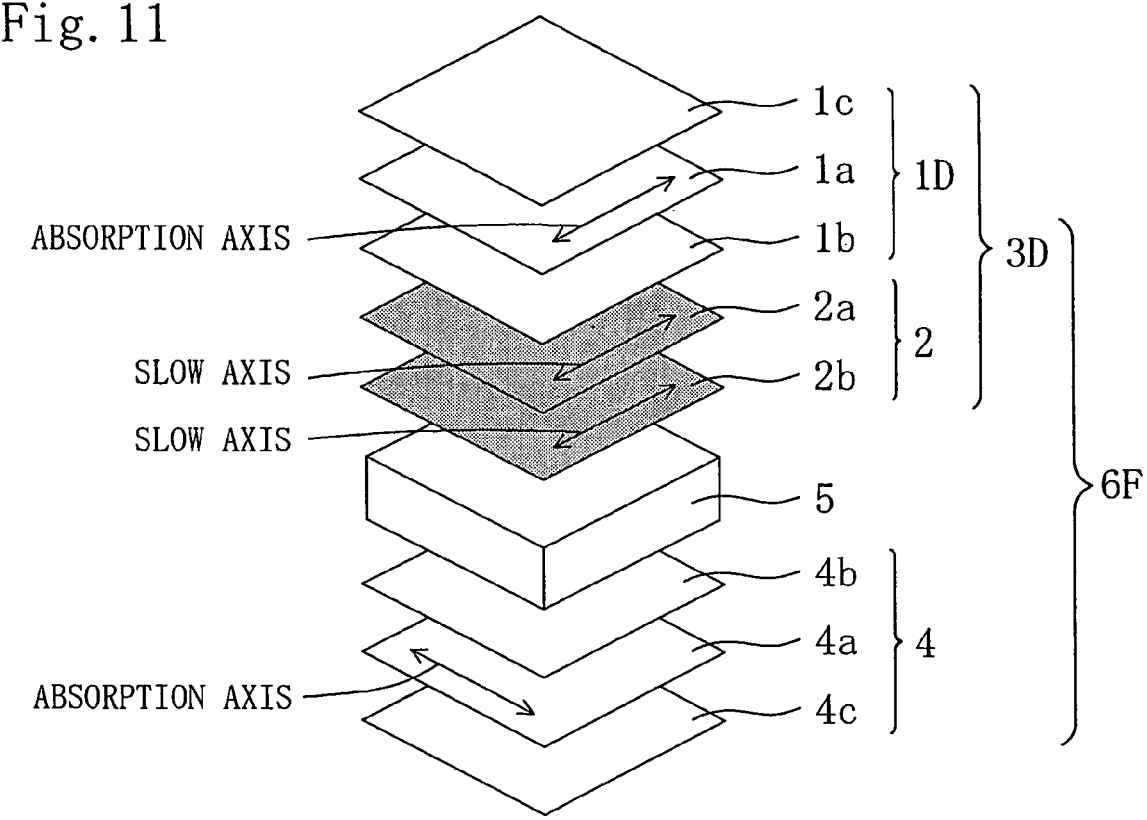
FIG. 11 is a schematic diagram showing an example of a liquid crystal panel according to the present invention.

FIG. 11 also shows a liquid crystal panel 6F in which the retardation film of the present invention is a laminate. In the liquid crystal panel 6F of FIG. 11, the optical film 3D (including the transparent protective film 1c, the polarizer 1a, the transparent protective film 1b, and the retardation film 2 of the present invention including two retardation films 2a and 2b) is arranged on one side of the liquid crystal cell 5 such that the retardation films 2 are closer to the liquid crystal cell 5. The polarizing plate 4 (including the transparent protective films 4b and 4c on both sides of the polarizer 4a) is arranged on the other side of the liquid crystal cell 5 such that the transparent protective film 4b is closer to the liquid crystal cell 5. FIG. 11 shows a case where slow axes of the retardation films 2a and 2b are parallel to each other in a laminate, but the slow axes thereof may be perpendicular to each other. Further, FIG. 11 shows a case where the slow axes of the retardation films 2 (2a and 2b) are parallel to the absorption axis of the polarizer 1a, but the slow axes of the retardation films 2 may be perpendicular thereto.

F. Application of Retardation Film and Optical Film

The retardation film and optical film of the present invention may be used for: a liquid crystal display apparatus such as a personal computer, a liquid crystal television, a cellular phone, or a personal digital assistance (PDA); or an image display apparatus such as an organic electroluminescence display (organic EL), a projector, a projection television, or a plasma television.

The kind of liquid crystal display apparatus is not particularly limited, and a transmissive, reflective, or transflective liquid crystal display apparatus may be included. Examples of liquid crystal cells used for the liquid crystal display apparatus include various liquid crystal cells such as twisted nematic (TN) mode, super twisted nematic (STN) mode, electrically controlled birefringence (ECB) mode, vertical alignment (VA) mode, in-plane switching (IPS) mode, fringe field switching (FFS) mode, hybrid alignment (HAN) mode, optically compensated bend (OCB) mode, surface stabilized ferroelectric liquid crystal (SSFLC) mode, and antiferroelectric liquid crystal (AFLC) mode. Of those, the retardation film and optical film of the present invention are preferably used in combination with the liquid crystal cell of TN mode, VA mode, IPS mode, FFS mode, or OCB mode. The retardation film and optical film of the present invention are most preferably used in combination with the liquid crystal cell of IPS mode or FFS mode.

The liquid crystal cell of twisted nematic (TN) mode refers to a liquid crystal cell having nematic liquid crystals with positive dielectric anisotropy between two substrates, and has liquid crystal molecule alignment twisted by 90° through surface alignment treatment of glass substrates. Specific examples thereof include: a liquid crystal cell described in "Ekisho Jiten", published by Baifukan Co., Ltd., p.158, 1989; and a liquid crystal cell described in JP 63-279229 A.

The liquid crystal cell of vertical alignment (VA) mode refers to a liquid crystal cell having nematic liquid crystals with negative dielectric anisotropy vertically aligned between transparent electrodes by utilizing an electrically controlled birefringence (ECB) effect when voltage is not applied. Specific examples thereof include: liquid crystal cells described in JP 62-210423 A and JP 04-153621 A. Further, as described in JP 11-258605 A, the liquid crystal cell of VA mode may include: a liquid crystal cell provided with a slit within pixel for expanding a viewing angle; and a liquid crystal cell of multi domain vertical alignment (MVA) mode by using a substrate having protrusions formed on a surface thereof. Also, as described in JP 10-123576 A, the liquid crystal cell of VA mode may include a liquid crystal cell of vertically aligned twisted nematic (VATN) mode in which a chiral agent is added to liquid crystals to substantially vertically align nematic liquid crystals when voltage is not applied and to provide twisted multi domain alignment of the liquid crystals when voltage is applied.

The liquid crystal cell of in-plane switching (IPS) mode refers to a liquid crystal cell wherein: homogeneously aligned nematic liquid crystals in the absence of an electric field respond in an electric field parallel to substrates (also referred to as a horizontal electric field) generated between a counter electrode and a pixel electrode each formed of metal, for example, by utilizing an electrically controlled birefringence (ECB) effect. To be specific, as described in "Monthly Display July" (p.83 to p.88, published by Techno Times Co., Ltd., 1997) or "Ekisho vol. 2, No. 4" (p.303 to p.316, published by Japanese Liquid Crystal Society, 1998), normally black mode provides completely black display in the absence of an electric field by: aligning an alignment direction of the liquid crystal cell with an absorption axis of one polarizer in the absence of application of an electric field; and arranging the polarizing plates above and below the liquid crystal cell to be perpendicular to each other. Under application of an electric field, liquid crystal molecules rotate while remaining parallel with substrates, to thereby obtain a transmittance in accordance with a rotation angle. The IPS mode includes super in-plane switching (S-IPS) mode and advanced super in-plane switching (AS-IPS) mode employing a V-shaped electrode, a zigzag electrode, or the like. Examples of a commercially available liquid crystal display apparatus of IPS mode include: 20-inch wide liquid crystal television "Wooo" (trade name, manufactured by Hitachi, Ltd.); 19-inch liquid crystal display "ProLite E481S-1" (trade name, manufactured by Iiyama Corporation); and 17-inch TFT liquid crystal display "FlexScan L565" (trade name, manufactured by Eizo Nanao Corporation).

The liquid crystal cell of fringe field switching (FFS) mode refers to a liquid crystal cell wherein: homogeneously aligned nematic liquid crystals in the absence of an electric field respond in an electric field parallel to substrates (also referred to as a horizontal electric field) and generated between a counter electrode and a pixel electrode each formed of transparent conductor, for example, by utilizing an electrically controlled birefringence (ECB) effect. The horizontal electric field in FFS mode is referred to as a fringe electric field, which can be generated by setting a distance between the counter electrode and the pixel electrode each formed of transparent conductor narrower than a cell gap. To be specific, as described in "Society for Information Display (SID) 2001 Digest" (p.484 to p.487) or JP 2002-031812 A, normally black mode provides completely black display in the absence of an electric field by: aligning an alignment direction of the liquid crystal cell with an absorption axis of one polarizer in the absence of application of an electric field; and arranging polarizing plates above and below the liquid crystal cell to be perpendicular to each other. Under application of an electric field, liquid crystal molecules rotate while remaining parallel with substrates, to thereby obtain a transmittance in accordance with a rotation angle. The FFS mode includes advanced fringe field switching (A-FFS) mode or ultra fringe field switching (U-FFS) mode employing a V-shaped electrode, a zigzag electrode, or the like. An example of a commercially available liquid crystal display apparatus of FFS mode includes Tablet PC "M1400" (trade name, manufactured by Motion Computing, Inc.).

The liquid crystal cell of optically compensated bend or optically compensated birefringence (OCB) mode refers to a liquid crystal cell in which nematic liquid crystals with positive dielectric anisotropy are bend aligned (where twisted alignment exists in a central part) between transparent electrodes by utilizing an electrically controlled birefringence (ECB) effect when voltage is not applied. The liquid crystal cell of OCB mode is also referred to asa "Π cell". Specific examples thereof include: a liquid crystal described in "Jisedai Ekisho Display", published by Kyoritsu Shuppan Co., Ltd., p.11 to p.27, 2000; and a liquid crystal described in JP 07-084254 A.

The retardation film and/or optical film of the present invention is used for the various liquid crystal cells, to thereby improve contrast ratio, color shift, or the like in an oblique direction and maintain the functions over a long period of time.

G. Application of Liquid Crystal Panel and Liquid Crystal Display Apparatus of the Present Invention The application of the liquid crystal panel and liquid crystal display apparatus of the present invention is not particularly limited, but the liquid crystal panel and liquid crystal display apparatus of the present invention may be used for various applications such as: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care and medical devices such as a nursing monitor and a medical monitor.

In particular, the liquid crystal panel and liquid crystal display apparatus of the present invention is preferably used for a large liquid crystal television. A liquid crystal television employing the liquid crystal panel and liquid crystal display apparatus of the present invention has a screen size of preferably wide 17-inch (373 mm×224 mm) or more, more preferably wide 23-inch (499 mm×300 mm) or more, particularly preferably wide 26-inch (566 mm×339 mm) or more, and most preferably wide 32-inch (687 mm×412 mm) or more.

The present invention will be described in more detail by using the following examples and comparative examples. The present invention is not limited to the examples. Analysis methods used in examples are described below.

(1) Identification of polycarbonate-based resin: $^1$H-NMR measurement was performed under the following conditions by using the following apparatus, and the polycarbonate-based resin was determined from an integration ratio of peaks of the obtained spectrum.

Analyzer: "JNM-EX400", manufactured by JEOL Ltd.

Transmitter nucleus: 1H

Frequency: 400 MHz

Pulse width: 45°

Pulse repeating time: 10 seconds

Measurement temperature: room temperature (2) Method of measuring molecular weight, and content of styrene-based resin: The molecular weight and the content of the styrene-based resin were calculated through a gel permeation chromatograph (GPC) method by using polystyrene as a standard sample. To be specific, the molecular weight and the content of the styrene-based resin were measured under the following measurement conditions by using the following apparatus and instruments.

Measurement sample: A sample resin was dissolved in tetrahydrofuran to prepare a 0.1 wt % solution which was left standing over night. Then, the solution was filtered through a 0.45 μm membrane filter to obtain a filtrate for measurement.

Analyzer: "HLC-812OGPC", manufactured by Tosoh Corporation

Column: TSK gel Super HM-H/H4000/H3000/H2000

Column size: 6.0 mm I.D.×150 mm

Eluant: tetrahydrofuran

Flow rate: 0.6 ml/min

Detector: RI

Column temperature: 40° C.

Injection amount: 20 μl (3) Method of measuring glass transition temperature (Tg): The glass transition temperature was measured in accordance with JIS K7121 under the following measurement conditions by using the following apparatus.

Analyzer: differential scanning calorimeter "DSC5500", manufactured by Seiko Instruments & Electronics Ltd.

Measurement atmosphere: in a stream of nitrogen at 20 ml/min

Temperature increase rate: 10° C./min (4) Method of measuring retardation values, wavelength dispersion property, angles of slow axes, and light transmittance: The retardation values, wavelength dispersion property, angles of slow axes, and light transmittance were measured by using an automatic birefringence analyzer ("KOBRA-21ADH", trade name, manufactured by Oji Scientific Instruments) based on a parallel Nicol rotation method by using light of a wavelength of 590 nm at 23° C.

(5) Method of measuring photoelastic coefficient: The retardation values of the sample were measured under stress by using a spectroscopic ellipsometer "M-220" (trade name, manufactured by JASCO Corporation), and the photoelastic coefficient was calculated from a slope of a function of the stress and retardation values. To be specific, an in-plane retardation value of a sample piece of 2 cm×10 cm was measured under stress of 5 N to 15 N by using light of a wavelength of 590 nm at 23° C.

(6) Method of measuring thickness: The thickness was measured by using a digital micrometer "K351C-type", manufactured by Anritsu Corporation.

(7) Method of measuring shrinkage ratio of shrinkable film: The shrinkage ratios S (MD) and S (TD) were determined in accordance with a heat shrinkage ratio A method of JIS Z1712 (except that: a heating temperature was changed from 120° C. to 140° C. or 160° C.; and a load of 3 g was added to a sample piece). To be specific, five samples having a width of 20 mm and a length of 150 mm were sampled from a longitudinal direction (machine direction (MD)) and a width direction (transverse direction (TD)), respectively. The sample pieces were each marked at a distance of about 100 mm at a center. The sample pieces each with a load of 3 g were hung vertically into an air-circulating thermostatic bath maintained at 140° C.±3° C. or 160° C.±3° C. The sample pieces were heated for 15 min, taken out of the thermostatic bath, and left standing under standard conditions (room temperature) for 30 min. Then, the distances between marks were measured by using a caliper in accordance with JIS B7507, to there by obtain an average of five measured values. A shrinkage ratio were calculated from an equation S(%)=[(distance between marks (mm) before heating−distance between marks (mm) after heating)/distance between marks (mm) before heating]×100.

(8) Method of measuring shrinkage stress in a width direction (TD) of shrinkable film: The shrinkage stress in a width direction (TD) was measured at 140° C. and 150° C. through a TMA method by using the following apparatus.

Apparatus: "TMA/SS 6100", manufactured by Seiko Instruments Inc.

Data processing: "EXSTAR6000", manufactured by Seiko Instruments Inc.

Measurement mode: measurement with constant temperature increase (10° C./min)

Measurement atmosphere: atmosphere air (room temperature)

Load: 20 mN

Sample size: 15 mm×2 mm (long side corresponds to width direction (TD))

Film thickness: 60 μm (9) Method of evaluating display unevenness of liquid crystal panel: A display screen was photographed by using the following liquid crystal cell and measurement apparatus. In Table 2, "Good" refers to a liquid crystal cell providing a difference in brightness of 1.5680 or less across an entire panel, and "No good" refers to a liquid crystal cell providing a difference in brightness of 1.7920 or more.

Liquid crystal cell: liquid crystal cell installed in "KLV-17HR2", manufactured by Sony Corporation Panel size: 375 mm×230 mm Measurement apparatus: two-dimensional color distribution measurement apparatus "CA-1500", manufactured by Konica Minolta Holdings, Inc.

Measurement environment: dark room (23° C.)

EXAMPLE 1

A polycarbonate-based resin having a weight average molecular weight (Mw) of 60,000 and containing repeating units represented by the following formulae (3) and (4) (number average molecular weight (Mn) of 33,000, Mw/Mn of 1.78, weight ratio (A): (B) of 4:6) was obtained through a conventional method by using phosgene as a carbonate precursor, and (A) 2,2-bis (4-hydroxyphenyl)propane and (B) 1,1-bis(4-hydroxyphenyl)-3,3,5-trimethylcyclohexane as aromatic dihydric phenol components. 70 parts by weight of the polycarbonate-based resin and 30 parts by weight of a styrene-based resin (HIMER SB75, available from Sanyo Chemical Industries, Ltd.) having a weight average molecular weight (Mw) of 1,300 (number average molecular weight (Mn) of 716, Mw/Mn of 1.78) were added into 300 parts by weight of dichloromethane. The whole was mixed under stirring at room temperature for 4 hours, to thereby prepare a clear solution. The solution was cast on a glass plate and left standing at room temperature for 15 min. Then, the solution was peeled off from the glass plate and dried in an oven at 80° C. for 10 min and at 120° C. for 20 min, to thereby obtain a polymer film having a thickness of 55 μm and a glass transition temperature (Tg) of 140° C. Light transmittance of the resultant polymer film at a wavelength of 590 nm was 93%.

The polymer film had an in-plane retardation value Re[590] of 5.0 nm, a thickness direction retardation value Rth[590] of 12.0 nm, and an average refractive index of 1.576.

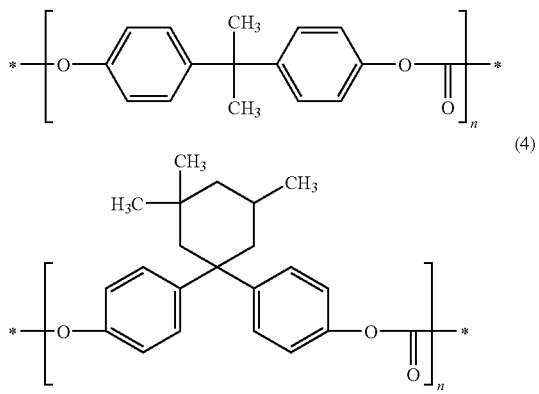

(3)

(4)

The polymer film obtained in Example 1 was dissolved in tetrahydrofuran, to thereby prepare a 0.1 wt % solution which was left standing for 8 hours. Then, the solution was filtered through a 0.45 μm membrane filter, and a filtrate was subjected to GPC measurement. The content of the styrene-based resin determined through the GPC measurement was 27 parts by weight with respect to 100 parts by weight of the total solid content.

A weight ratio of the aromatic dihydric phenol compound components was determined through $^1$H-NMR measurement of the polymer film obtained in Example 1. To be specific, the polymer film was dissolved in chloroform, and the chloroform solution was dropped into 100 times by weight of methanol, to thereby precipitate (reprecipitate) a white solid at 23° C. The solution was filtered and separated into a methanol soluble fraction and a methanol insoluble fraction. The methanol insoluble fraction was dissolved in chloroform-D for $^1$H-NMR measurement. As a result, a weight ratio of components was 4:6, determined from an integration ratio of peaks at 1.68 ppm (6H) derived from a methyl group of 2,2-bis(4-hydroxyphenyl)propane and at 2.69 ppm (6H) derived from a methyl group substituted at a 3-position of a cyclohexyl ring of 1,1-bis(4-hydroxyphenyl)-3,3,5-trimethylcyclohexane in an $^1$H-NMR spectrum.

A biaxially stretched polypropylene film "TORAYFAN" (trade name, thickness of 60 μm, available from Toray Industries, Inc.) having the properties shown in Table 1 was attached to both sides of the polymer film (thickness of 55 μm) through an acrylic pressure sensitive adhesive layer (thickness of 15 μm). Then, the resultant was stretched 1.29 times in an air-circulating thermostatic oven at 147° C. (temperature at a distance of 3 cm from a back surface of the film, temperature fluctuation of ±1° C.) by using a roll stretching machine while a longitudinal direction of the film was held (delivery speed of 1 m/min), to thereby produce a retardation film. Table 2 shows the properties of the obtained retardation film.

TABLE 1

| Shrinkable film | | |
|---|---|---|
| Shrinkage ratio at 140° C. (longitudinal direction) | $S^{140}$ (MD) (%) | 5.7 |
| Shrinkage ratio at 140° C. (width direction) | $S^{140}$ (TD) (%) | 7.6 |
| Difference in shrinkage ratio at 140° C. (width direction − longitudinal direction) | $\Delta S^{140}$ (%) | 1.9 |
| Shrinkage ratio at 160° C. (longitudinal direction) | $S^{160}$ (MD) (%) | 18.0 |
| Shrinkage ratio at 160° C. (width direction) | $S^{160}$ (TD) (%) | 35.7 |
| Difference in shrinkage ratio at 160° C. (width direction − longitudinal direction) | $\Delta S^{160}$ (%) | 17.7 |
| Shrinkage stress at 140° C. in width direction | $T_A^{140}$ (TD) (N/2 mm) | 0.45 |
|  | $T_B^{140}$ (TD) (N/mm$^2$) | 7.5 |
| Shrinkage stress at 150° C. in width direction | $T_A^{150}$ (TD) (N/2 mm) | 0.56 |
|  | $T_B^{150}$ (TD) (N/mm$^2$) | 9.3 |

TABLE 2

|  | Polymer film | | | | Retardation film | | | | | | | |
|---|---|---|---|---|---|---|---|---|---|---|---|---|
|  | Thickness: before stretch (μm) | Glass transition temperature (° C.) | Stretching conditions | | Thickness: after stretch (μm) | Re [590] (nm) | Rth [590] (nm) | Rth [590]/ Re[590] | Re [480]/ Re[590] | Variation in alignment angle (°) | C [590] (m$^2$/N) | Display evenness |
|  |  |  | Stretching temperature (° C.) | Stretch ratio (%) |  |  |  |  |  |  |  |  |
| Example 1 | 55 | 140 | 147 | 1.29 | 59 | 280.0 | 140.0 | 0.50 | 1.08 | ±0.2 | 5.0 × 10$^{-11}$ | Good |
| Example 2 | 55 | 140 | 146 | 1.09 | 60 | 130.2 | 39.1 | 0.30 | 1.08 | ±0.2 | 5.0 × 10$^{-11}$ | Good |
| Example 3 | 55 | 140 | 141 | 1.10 | 54 | 140.0 | 70.0 | 0.50 | 1.08 | ±0.2 | 5.0 × 10$^{-11}$ | Good |
| Example 4 | 55 | 140 | 145 | 1.14 | 58 | 158.2 | 71.2 | 0.45 | 1.08 | ±0.2 | 5.0 × 10$^{-11}$ | Good |

TABLE 2-continued

| | Polymer film | | | | Retardation film | | | | | | | |
|---|---|---|---|---|---|---|---|---|---|---|---|---|
| | Thickness: before stretch (μm) | Glass transition temperature (°C.) | Stretching conditions | | Thickness: after stretch (μm) | Re [590] (nm) | Rth [590] (nm) | Rth [590]/ Re[590] | Re [480]/ Re[590] | Variation in alignment angle (°) | C [590] (m²/N) | Display evenness |
| | | | Stretching temperature (°C.) | Stretch ratio (%) | | | | | | | | |
| Example 5 | 55 | 140 | 153 | 1.18 | 66 | 172.0 | 41.0 | 0.24 | 1.08 | ±0.2 | 5.0 × 10⁻¹¹ | Good |
| Example 6 | 55 | 140 | 155 | 1.22 | 66 | 203.3 | 59.3 | 0.29 | 1.08 | ±0.2 | 5.0 × 10⁻¹¹ | Good |
| Example 7 | 55 | 140 | 146 | 1.25 | 62 | 230.0 | 115.0 | 0.50 | 1.08 | ±0.2 | 5.0 × 10⁻¹¹ | Good |
| Example 8 | 55 | 140 | 147 | 1.27 | 64 | 270.0 | 132.0 | 0.49 | 1.08 | ±0.2 | 5.0 × 10⁻¹¹ | Good |
| Example 9 | 55 | 140 | 147 | 1.29 | 59 | 280.0 | 140.0 | 0.50 | 1.08 | ±0.2 | 5.0 × 10⁻¹¹ | Good |
| Comparative Example 1 | 60 | 150 | 160 | 1.10 | 65 | 284.0 | 135.0 | 0.48 | 1.05 | ±0.2 | 1.0 × 10⁻¹⁰ | No good |
| Comparative Example 2 | 40 | 150 | 160 | 1.05 | 44 | 140.0 | 65.0 | 0.46 | 1.05 | ±0.2 | 1.0 × 10⁻¹⁰ | No good |
| Comparative Example 3 | 60 | 171 | 175 | 1.30 | 61 | 133.0 | 126.4 | 0.95 | 1.00 | ±0.2 | 5.0 × 10⁻¹² | Not measured |

Note that, an acrylic pressure sensitive adhesive used in Example 1 was prepared by: using as a base polymer isononyl acrylate (weight average molecular weight of 550,000) synthesized through solution polymerization; and mixing 3 parts by weight of a crosslinking agent of a polyisocyanate compound "Collonate L" (trade name, available from Nippon Polyurethane Industry Co., Ltd.) and 10 parts by weight of a catalyst "OL-1" (trade name, available from Tokyo Fine Chemical Co., Ltd.) with respect to 100 parts by weight of the base polymer.

EXAMPLE 2

A retardation film was produced in the same manner as in Example 1 except that the stretching temperature was changed from 147° C. to 146° C., and the stretch ratio was changed from 1.29 times to 1.09 times. Table 2 shows the properties of the obtained retardation film.

EXAMPLE 3

A retardation film was produced in the same manner as in Example 1 except that the stretching temperature was changed from 147° C. to 141° C., and the stretch ratio was changed from 1.29 times to 1.10 times. Table 2 shows the properties of the obtained retardation film.

EXAMPLE 4

A retardation film was produced in the same manner as in Example 1 except that the stretching temperature was changed from 147° C. to 145° C., and the stretch ratio was changed from 1.29 times to 1.14 times. Table 2 shows the properties of the obtained retardation film.

EXAMPLE 5

A retardation film was produced in the same manner as in Example 1 except that the stretching temperature was changed from 147° C. to 153° C., and the stretch ratio was changed from 1.29 times to 1.18 times. Table 2 shows the properties of the obtained retardation film.

EXAMPLE 6

A retardation film was produced in the same manner as in Example 1 except that the stretching temperature was changed from 147° C. to 154.5° C., and the stretch ratio was changed from 1.29 times to 1.22 times. Table 2 shows the properties of the obtained retardation film.

EXAMPLE 7

A retardation film was produced in the same manner as in Example 1 except that the stretching temperature was changed from 147° C. to 146° C., and the stretch ratio was changed from 1.29 times to 1.25 times. Table 2 shows the properties of the obtained retardation film.

EXAMPLE 8

A retardation film was produced in the same manner as in Example 1 except that the stretch ratio was changed from 1.29 times to 1.27 times. Table 2 shows the properties of the obtained retardation film.

EXAMPLE 9

A retardation film was obtained through the same heat stretching method as that in Example 1 by using a polymer film "Elmech PF" (trade name, thickness of 55 μm, available from Kaneka Corporation) containing a styrene-based resin and a polycarbonate-based resin. Table 2 shows the properties of the obtained retardation film.

COMPARATIVE EXAMPLE 1

A polycarbonate-based resin was obtained through a conventional method by using phosgene as a carbonate precursor substance and bisphenol A as an aromatic dihydric phenol component. Next, a biaxially stretched polypropylene film was attached to both sides of a polymer film (thickness of 60 μm) composed of the polycarbonate-based resin through an acrylic pressure sensitive adhesive layer. Then, the film was stretched by using a roll stretching machine at 160° C. and 1.10 times while a longitudinal direction of the film was held (delivery speed of 1 m/min). Table 2 shows the properties of the obtained retardation film. The biaxially stretched propylene film and the acrylic pressure sensitive adhesive used in Comparative Example 1 were the same as those used in Example 1. Note that, the polymer film composed of the polycarbonate-based resin had a glass transition temperature (Tg) of 150° C., Re[590] before stretching of 7.0 nm, and Rth[590] before stretching of 15.0 nm.

COMPARATIVE EXAMPLE 2

A retardation film was produced in the same manner as in Comparative Example 1 except that the thickness of the polymer film of Comparative Example 1 was changed from 60 μm to 40 μm, and the stretch ratio was changed from 1.10 times to 1.05 times. Table 2 shows the properties of the obtained retardation film.

COMPARATIVE EXAMPLE 3

A biaxially stretched polypropylene film was attached to both sides of a norbornene-based resin film "ARTON F" (trade name, available from JSR Corporation) through an acrylic pressure sensitive adhesive layer. Then, the film was stretched by using a roll stretching machine at 175° C. and 1.30 times while a longitudinal direction of the film was held. Table 2 shows the properties of the obtained retardation film. The biaxially stretched propylene film and the acrylic pressure sensitive adhesive used in Comparative Example 3 were the same as those used in Example 1. Note that, the polymer film composed of the norbornene-based resin had a glass transition temperature (Tg) of 171° C., Re[590] before stretching of 2.0 nm, and Rth[590] before stretching of 10.0 nm.

EXAMPLE 10

(Production of Polarizing Plate)

A polyvinyl alcohol film was colored in an aqueous solution containing iodine and then uniaxially stretched between rollers of different speed ratios in an aqueous solution containing boric acid, to thereby obtain a polarizer. A norbornene-based resin film "ZEONOR ZF14-040" (trade name, available from Zeon Corporation) having a thickness of 40 μm was attached to one side of the polarizer through a polyvinyl alcohol-based adhesive "GOHSEFIMER-Z" (trade name, available from The Nippon Synthetic Chemical Industry Co., Ltd.) after an adhesion primer "A-1110" (trade name, available from Nippon Unicar Company Limited) was applied with thickness of 0.1 μm on an adhesive surface of the polarizer. Then, a triacetyl cellulose film "FUJITAC" (trade name, available from Fuji Photo Film Co., Ltd.) having a thickness of 40 μm was attached to the other surface through the polyvinyl alcohol-based adhesive, to thereby obtain a polarizing plate P. The norbornene-based resin film had Re[590] of 1.0 nm, Rth[590] of 3.0 nm, and an absolute value of photoelastic coefficient C[590] of $3.10 \times 10^{-12}$ (m²/N).

(Production of Optical Film)

The retardation film obtained in Example 1 was attached to the surface of the norbornene-based resin film of the polarizing plate P through an acrylic pressure sensitive adhesive such that a slow axis of the retardation film was parallel to (0°±1.0°) an absorption axis of the polarizer, to thereby obtain an optical film Q.

(Production of Liquid Crystal Display Apparatus)

A liquid crystal panel was taken out of a liquid crystal display apparatus "KLV-17HR2" (manufactured by Sony Corporation) including a liquid crystal cell of IPS mode. Polarizing plates arranged above and below the liquid crystal cell were removed, and glass surfaces (front and back surfaces) were washed. Then, the optical film Q was attached to a viewer side of the liquid crystal cell through an acrylic pressure sensitive adhesive, and the polarizing plate P was attached to a backlight side of the liquid crystal cell through the acrylic pressure sensitive adhesive, to thereby obtain a liquid crystal panel I. The optical film Q was arranged on the liquid crystal cell such that the retardation film was closer to the liquid crystal cell. The polarizing plate P was arranged on the liquid crystal cell such that the norbornene-based resin film was closer to the liquid crystal cell.

Figure 12:
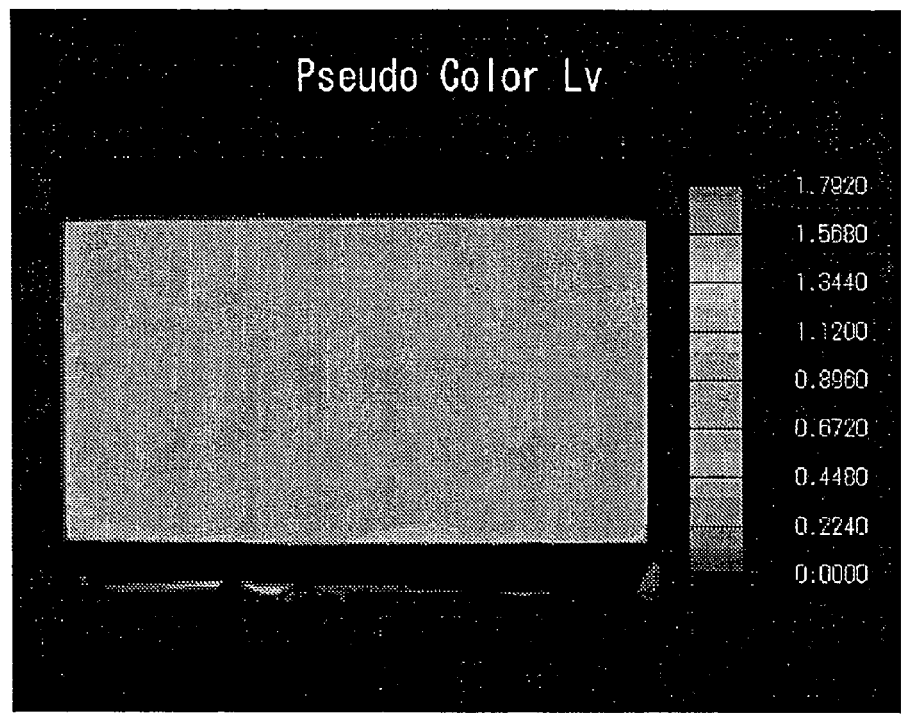
FIG. 12 is a photograph showing display unevenness of a liquid crystal display apparatus according to the present invention.

The liquid crystal panel I was incorporated into the original liquid crystal display apparatus, and backlight was turned on for 8 hours. Then, a display screen of the liquid crystal display apparatus was photographed in a dark room by using a two-dimensional color distribution measurement apparatus "CA-1500" (manufactured by Konica Minolta Holdings, Inc.). As shown in FIG. 12, there was little display unevenness due to heat of backlight.

COMPARATIVE EXAMPLE 4

Figure 13:
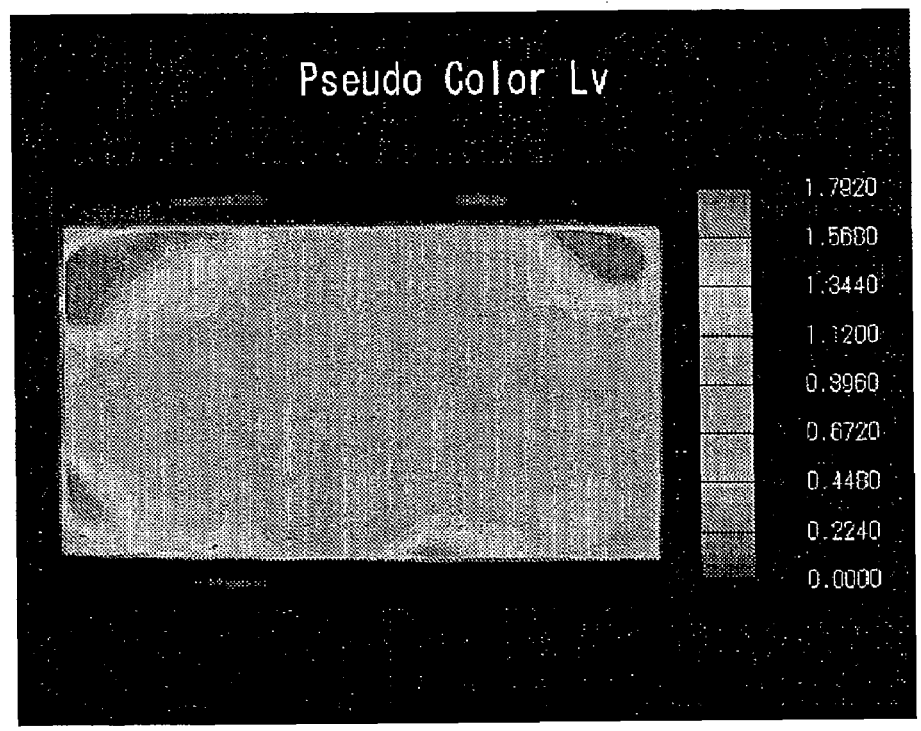
FIG. 13 is a photograph showing display unevenness of a conventional liquid crystal display apparatus.

In the section (production of optical film) of Example 10, the retardation film obtained in Comparative Example 1 was used instead of the retardation film obtained in Example 1, to thereby produce a liquid crystal panel II. The liquid crystal panel II was incorporated into a liquid crystal display apparatus "KLV-17HR2" (manufactured by Sony Corporation), and backlight was turned on for 8 hours. Then, a display screen of the liquid crystal display apparatus was photographed in the same manner as in Example 10. As shown in FIG. 13, there was large display unevenness to a great extent due to backlight.

[Evaluation]

Figure 14:
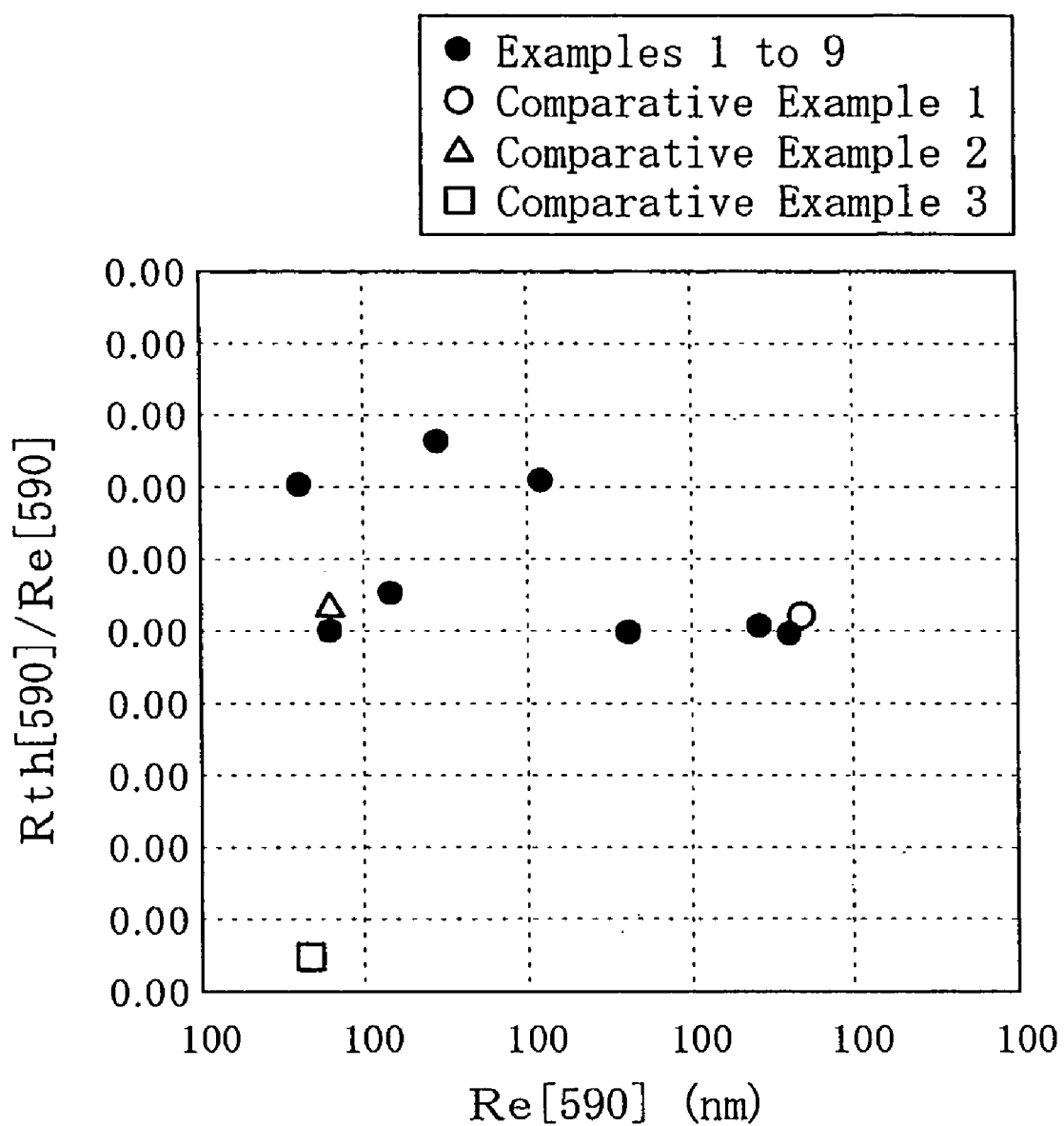
FIG. 14 is a graph showing a relationship between Re[590] and Rth[590]/Re[590] of a retardation film according to the present invention.

FIG. 14 is a graph showing a relationship between an in-plane retardation value Re[590] and Rth[590]/Re[590] of the retardation film of each of Examples 1 to 9 and Comparative Examples 1 to 3. As shown in FIG. 14, Example 1 to 9 each provided a retardation film having 0<Rth[590]/Re[590] <1 (that is, having a refractive index profile of nx>nz>ny) and a wide range of retardation values. Further, the retardation films of Examples 1 to 9 each were hardly torn in a parallel direction to the stretching direction, and had sufficient mechanical strength for practical use. As shown in FIG. 12, the liquid crystal display apparatus of Example 10 incorporating the liquid crystal employing the retardation film of Example 1 had little display unevenness due to heat of backlight. The retardation films of Examples 2 to 9 were evaluated in the same manner as in Example 1, resulting in little display unevenness. Note that, in Examples 2 to 5, two retardation films were used such that the respective slow axes were parallel to each other. In contrast, as shown in Comparative Example 3, no aliphatic resin film had a Rth[590]/Re[590] value of less than 0.90. Further, the retardation film obtained in Comparative Example 3 was liable to tear in a parallel direction to the stretching direction, and had insufficient mechanical strength for practical use. Meanwhile, in Comparative Examples 1 and 2, the retardation films each having similar Rth[590]/Re[590] values to those of Example 1 and 3 were produced. However, as shown in FIG. 13, the liquid crystal display apparatus incorporating the retardation film of Comparative Example 1 obtained through a conventional technique instead of the retardation film of Example 10 had display unevenness to a great extent due to heat of backlight. The retardation film of Comparative Example 2 was evaluated in the same manner as in Comparative Example 1, resulting in display unevenness to a great extent. The results reveal that a retardation film is produced by stretching a polymer film formed of a blended product of predetermined amounts of a styrene-based resin and a polycarbonate-based resin, to thereby allow significant improvement in display unevenness due to heat of backlight. Note that, in Comparative Example 2, two retardation films were used such that the respective slow axes were parallel to each other.

As described above, the present invention can provide a retardation film which hardly causes shift or unevenness in retardation values due to stress even when it is used for the liquid crystal display apparatus, which has a refractive index profile of nx>nz>ny, and which has a wide range of retardation values. Therefore, the retardation film of the present invention is very useful for improving display properties of the liquid crystal display apparatus.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A retardation film comprising a stretched polymer film containing a styrene-based resin and a polycarbonate-based resin, which satisfies the following expressions (1) and (2):

$$100\ nm \leq Re[590] \leq 350\ nm \tag{1}$$

$$0.2 \leq Rth[590]/Re[590] \leq 0.8 \tag{2}$$

(in the expressions (1) and (2), Re [590] and Rth[590] respectively represent in-plane retardation and thickness direction retardation values of the film measured by using light of a wavelength of 590 nm at 23° C.);
wherein a content of the styrene-based resin is 10 to 40 parts by weight with respect to 100 parts by weight of a total solid content; and
wherein an absolute value of photoelastic coefficient of the retardation film measured by using light of a wavelength of 590 nm at 23° C. is $2.0 \times 10^-$ to $8.0 \times 10^{-11}\ m^2/N$.

2. A retardation film according to claim 1, wherein the polycarbonate-based resin comprises repeating units represented by the following formulae (3) and (4):

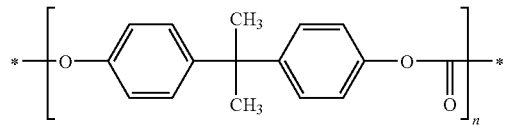

(3)

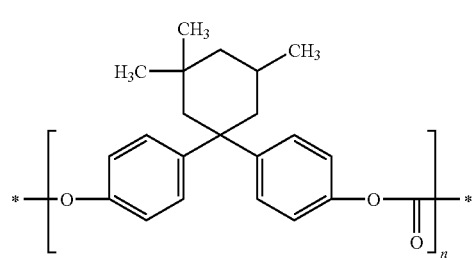

(in the formulae (3) and (4), n represents an integer of 2 or more).

3. An optical film comprising a polarizer and a retardation film laminated on at least one side of the polarizer, wherein:
a slow axis of the retardation film is one of parallel and perpendicular to an absorption axis of the polarizer;
the retardation film comprises a stretched polymer film containing a styrene-based resin and a polycarbonate-based resin; and
the retardation film satisfies the following expressions (1) and (2):

$$100\ nm \leq Re[590] \leq 350\ nm \tag{1}$$

$$0.2 \leq Rth[590]/Re[590] \leq 0.8 \tag{2}$$

(in the expressions (1) and (2), Re[590] and Rth[590] respectively represent in-plane retardation and thickness direction retardation values of the film measured by using light of a wavelength of 590 nm at 23° C.);
wherein a content of the styrene-based resin is 10 to 40 parts by weight with respect to 100 parts by weight of a total solid content; and
wherein an absolute value of photoelastic coefficient of the retardation film measured by using light of a wavelength of 590 nm at 23° C. is $2.0 \times 10^{-11}$ to $8.0 \times 10^{-11}\ m^2/N$.

4. An optical film according to claim 3, further comprising a transparent protective film on at least one side of the polarizer.

5. An optical film according to claim 4, wherein: the transparent protective film is provided on both sides of the polarizer;
the retardation film is laminated on at least one transparent protective film; and
the transparent protective film having the retardation film laminated thereon satisfies the following expressions (5) and (6):

$$0\ nm < Re[590] \leq 5\ nm \tag{5}$$

$$0\ nm < Rth[590] \leq 10\ nm \tag{6}.$$

6. A liquid crystal panel comprising a liquid crystal cell and a retardation film on at least one side of the liquid crystal cell, wherein:
the retardation film comprises a stretched polymer film containing a styrene-based resin and a polycarbonate-based resin; and
the retardation film satisfies the following expressions (1) and (2):

$$100\ nm \leq Re[590] \leq 350\ nm \tag{1}$$

$$0.2 \leq Rth[590]/Re[590] \leq 0.8 \tag{2}$$

(in the expressions (1) and (2), Re[590] and Rth[590] respectively represent in-plane retardation and thickness direction retardation values of the film measured by using light of a wavelength of 590 nm at 23° C.);

wherein a content of the styrene-based resin is 10 to 40 parts by weight with respect to 100 parts by weight of a total solid content; and wherein an absolute value of photoelastic coefficient of the retardation film measured by using light of a wavelength of 590 nm at 23° C. is $2.\times10^{-11}$ to $8.0\times10^{-11}$ m$^2$/N.

7. A liquid crystal panel according to claim 6, wherein the liquid crystal cell comprises a liquid crystal cell of one of TN mode, VA mode, IPS mode, FFS mode, and OCB mode.

8. A liquid crystal display apparatus comprising the liquid crystal panel according to claim 6.

9. A liquid crystal television comprising the liquid crystal panel according to claim 6.

10. A liquid crystal panel according to claim 6, wherein the retardation film is the only retardation film within the liquid crystal panel.

11. A liquid crystal panel comprising a liquid crystal cell and an optical film on at least one side of the liquid crystal cell, wherein:

the optical film comprises a polarizer and a retardation film laminated on at least one side of the polarizer;

a slow axis of the retardation film is one of parallel and perpendicular to an absorption axis of the polarizer;

the retardation film comprises a stretched polymer film containing a styrene-based resin and a polycarbonate-based resin; and the retardation film satisfies the following expressions (1) and (2):

$$100 \text{ nm} \leq Re[590] \leq 350 \text{ nm} \quad (1)$$

$$0.2 \leq Rth[590]/Re[590] \leq 0.8 \quad (2)$$

(in the expressions (1) and (2), Re[590] and Rth[590] respectively represent in-plane retardation and thickness direction retardation values of the film measured by using light of a wavelength of 590 nm at 23° C.);

wherein a content of the styrene-based resin is 10 to 40 parts by weight with respect to 100 parts by weight of a total solid content; and wherein an absolute value of photoelastic coefficient of the retardation film measured by using light of a wavelength of 590 nm at 23° C. is $2.0\times10^{-11}$ to $8.0\times10^{-11}$ m$^2$/N.

12. A liquid crystal panel according to claim 11, wherein the liquid crystal cell comprises a liquid crystal cell of one of TN mode, VA mode, IPS mode, FFS mode, and OCB mode.

13. A liquid crystal display apparatus comprising the liquid crystal panel according to claim 11.

14. A liquid crystal television comprising the liquid crystal panel according to claim 11.

* * * * *